US012750294B2

(12) United States Patent
Li et al.

(10) Patent No.: US 12,750,294 B2
(45) Date of Patent: Sep. 29, 2026

(54) DETECTION PACKET TRANSMISSION METHOD, APPARATUS, AND SYSTEM

(71) Applicant: Huawei Technologies Co., Ltd., Shenzhen (CN)

(72) Inventors: Weidong Li, Beijing (CN); Jinming Huang, Dongguan (CN); Fang Xin, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 424 days.

(21) Appl. No.: 18/471,618

(22) Filed: Sep. 21, 2023

(65) Prior Publication Data

US 2024/0015089 A1 Jan. 11, 2024

Related U.S. Application Data

(63) Continuation of application No. PCT/CN2022/081460, filed on Mar. 17, 2022.

(30) Foreign Application Priority Data

Mar. 24, 2021 (CN) ......................... 202110315772.4

(51) Int. Cl.
*H04L 43/0823* (2022.01)

(52) U.S. Cl.
CPC ................................ *H04L 43/0823* (2013.01)

(58) Field of Classification Search
None
See application file for complete search history.

(56) References Cited

U.S. PATENT DOCUMENTS

| | | | | |
|---|---|---|---|---|
| 11,528,201 | B1 * | 12/2022 | Richards | H04L 43/062 |
| 2019/0372877 | A1 * | 12/2019 | Nainar | H04L 45/16 |
| 2022/0173991 | A1 | 6/2022 | Xiong et al. | |
| 2023/0336450 | A1 * | 10/2023 | Filsfils | H04L 43/0805 |

FOREIGN PATENT DOCUMENTS

| | | | |
|---|---|---|---|
| CN | 106817269 | A | 6/2017 |
| CN | 111953604 | A | 11/2020 |
| CN | 112398557 | A | 2/2021 |
| EP | 3817298 | A1 | 5/2021 |
| EP | 4054126 | A1 | 9/2022 |
| EP | 4092965 | A1 | 11/2022 |
| WO | 2019233179 | A1 | 12/2019 |

* cited by examiner

*Primary Examiner* — Christine T Duong
(74) *Attorney, Agent, or Firm* — Conley Rose, P.C.

(57) ABSTRACT

In a detection packet transmission method, a first network device receives a first packet, where the first packet includes a detection header indicating a network device to detect, based on the detection header, transmission performance of a service flow in which the first packet is located, and the first network device is an edge network device in a first network domain. The first network device obtains a second packet based on the first packet, where the second packet includes processing identification information and the detection header, the processing identification information indicates a second network device to process the detection header, and the second network device is a next-hop device of the first network device on a transmission path of the service flow. The first network device sends the second packet to the second network device.

21 Claims, 12 Drawing Sheets

DETECTION PACKET TRANSMISSION METHOD, APPARATUS, AND SYSTEM

CROSS-REFERENCE TO RELATED APPLICATIONS

This is a continuation of Int'l Patent App. No. PCT/CN2022/081460, filed on Mar. 17, 2022, which claims priority to Chinese Patent App. No. 202110315772.4, filed on Mar. 24, 2021, both of which are incorporated by reference.

FIELD

This disclosure relates to the field of communication technologies, and in particular, to a detection packet transmission method, apparatus, and system.

BACKGROUND

An In-situ Flow Information Telemetry (IFIT) technology is an important detection technology. A detection principle of this technology is as follows: An IFIT header is inserted into a service packet, and transmission performance of a service flow is detected based on the IFIT header in the service packet. For example, in a virtual private network (VPN) scenario, a tunnel is usually created in a VPN to transmit a service flow, and transmission performance of a service flow in which a service packet is located may be detected based on an IFIT header in the service packet transmitted over the tunnel. The transmission performance of the service flow is, for example, a number of lost packets in the service flow, a transmission delay of the service flow, or the like.

In a VPN-based IFIT technology, after a head node device of a tunnel receives a service packet, if information (for example, a 5-tuple) about the service packet matches information about a to-be-detected service flow, the head node device generates a flow identifier (flowID) for a service flow in which the service packet is located, inserts an IFIT header into the service packet, and records the flow identifier in the IFIT header to obtain an IFIT packet. Then, the head node device forwards the IFIT packet to a transit node device of the tunnel, the transit node device forwards the IFIT packet to a tail node device of the tunnel, and the tail node device removes the IFIT header from the IFIT packet. In the foregoing process, the head node device, the transit node device, and the tail node device separately collect, based on the flow ID in the IFIT header, statistics on performance information of a service flow in which the IFIT packet is located, to detect transmission performance of the service flow.

A current IFIT technology can be used to detect transmission performance of a service flow transmitted over a VPN. In a process in which an IFIT packet is transmitted from the VPN, a tail node device of a tunnel removes an IFIT header from the IFIT packet. Therefore, a service packet transmitted from the VPN does not carry the IFIT header. As a result, the current IFIT technology cannot be used to detect transmission performance of a service flow between a device in the VPN and a device outside the VPN. Therefore, scenarios of the current IFIT technology are limited, and flexibility is poor.

SUMMARY

This disclosure provides a detection packet transmission method, apparatus, and system. This helps improve flexibility of detection of transmission performance of a service flow, and scenarios are wide. The technical solutions of this disclosure are as follows:

According to a first aspect, a detection packet transmission method is provided. The method includes: A first network device receives a first packet, where the first packet includes a detection header indicating a network device to detect, based on the detection header, transmission performance of a service flow in which the first packet is located, and the first network device is an edge network device in a first network domain. The first network device obtains a second packet based on the first packet, where the second packet includes processing identification information and the detection header, the processing identification information indicates a second network device to process the detection header, the second network device is a next-hop device of the first network device on a transmission path of the service flow, and the second network device does not belong to the first network domain. The first network device sends the second packet to the second network device.

That the first network device is an edge network device in a first network domain means: The first network device belongs to the first network domain and is located at an edge of the first network domain.

According to the technical solutions provided, after receiving the first packet including the detection header, the first network device that belongs to the first network domain and is located at the edge of the first network domain obtains, based on the first packet, the second packet including the processing identification information and the detection header, and sends the second packet to the second network device that does not belong to the first network domain, so that the second network device processes the detection header based on an indication of the processing identification information, to detect, based on the detection header, the transmission performance of the service flow in which the first packet is located. In this way, transmission performance of a service flow between the first network device in the first network domain and the second network device outside the first network domain is detected. This helps improve flexibility of detection of transmission performance of a service flow, and scenarios are wide.

Optionally, the second packet further includes a media access control (MAC) header and an Internet Protocol (IP) header, and the processing identification information and the detection header are located between the MAC header and the IP header.

Optionally, the processing identification information and the detection header are distributed, between the MAC header and the IP header, towards the MAC header and away from the MAC header, and the processing identification information and the detection header are adjacent to each other.

Optionally, the processing identification information includes an indication identifier and a detection identifier, the indication identifier indicates the second network device to process the detection identifier, and the detection identifier indicates the second network device to process the detection header.

Optionally, the indication identifier and the detection identifier are distributed, between the MAC header and the detection header, towards the MAC header and away from the MAC header, and the indication identifier and the detection identifier are adjacent to each other.

Optionally, the detection header is an IFIT header.

According to the technical solutions provided, because the detection header is the IFIT header, in-situ flow telemetry of transmission performance of a service flow can be implemented. This helps improve accuracy of a detection result.

Optionally, the second network device is an edge network device in a second network domain. In other words, the second network device belongs to the second network domain and the second network device is located at an edge of the second network domain.

According to the technical solutions provided, after receiving the first packet including the detection header, the first network device that belongs to the first network domain and is located at the edge of the first network domain obtains, based on the first packet, the second packet including the processing identification information and the detection header, and sends the second packet to the second network device that belongs to the second network domain and is located at the edge of the second network domain, so that the second network device processes the detection header based on the indication of the processing identification information, to detect, based on the detection header, the transmission performance of the service flow in which the first packet is located. In this way, transmission performance of a service flow transmitted across network domains is detected.

Optionally, the first network device is a tail node device of a first tunnel that belongs to the first network domain, the second network device is a head node device of a second tunnel that belongs to the second network domain, and the first tunnel and the second tunnel each are a segment of a tunnel on the transmission path.

Optionally, at least one of the first network domain and the second network domain is a VPN. For example, the first network domain and the second network domain are both VPNs, and the first tunnel and the second tunnel are both VPN tunnels.

According to the technical solutions provided, because at least one of the first network domain and the second network domain is a VPN, transmission performance of a service flow between a device in the VPN and a device outside the VPN can be detected, for example, transmission performance of a service flow transmitted across VPNs can be detected. This helps improve flexibility of detection of transmission performance of a service flow, and scenarios are wide.

Optionally, the method further includes: The first network device enables a capability of carrying the processing identification information and the detection header in a packet that is sent through a first interface of the first network device.

Correspondingly, that the first network device sends the second packet to the second network device includes: The first network device sends the second packet to the second network device through the first interface of the first network device.

According to the technical solutions provided, the first network device enables the capability of carrying the processing identification information and the detection header in the packet that is sent through the first interface of the first network device, so that the first network device can send, to the second network device through the first interface, the second packet that carries the processing identification information and the detection header, and therefore, the second network device can process the detection header based on the indication of the processing identification information, to detect, based on the detection header, the transmission performance of the service flow in which the first packet is located.

According to a second aspect, a detection packet transmission method is provided. The method includes: A second network device receives a second packet sent by a first network device, where the second packet is obtained by the first network device based on a first packet, the first packet includes a detection header indicating a network device to detect, based on the detection header, transmission performance of a service flow in which the first packet is located, the second packet includes processing identification information and the detection header, the processing identification information indicates the second network device to process the detection header, the first network device is an edge network device in a first network domain, the second network device is a next-hop device of the first network device on a transmission path of the service flow, and the second network device does not belong to the first network domain. The second network device detects the transmission performance of the service flow based on the processing identification information and the detection header.

That the first network device is an edge network device in a first network domain means: The first network device belongs to the first network domain and is located at an edge of the first network domain.

According to the technical solutions provided, the first network device that belongs to the first network domain and is located at the edge of the first network domain obtains, based on the received first packet including the detection header, the second packet including the processing identification information and the detection header, and sends the second packet to the second network device that does not belong to the first network domain. After receiving the second packet, the second network device processes the detection header in the second packet based on an indication of the processing identification information in the second packet, to detect, based on the detection header, the transmission performance of the service flow in which the first packet is located. In this way, transmission performance of a service flow between the first network device in the first network domain and the second network device outside the first network domain is detected. This helps improve flexibility of detection of transmission performance of a service flow, and scenarios are wide.

Optionally, the second packet further includes a MAC header and an IP header, and the processing identification information and the detection header are located between the MAC header and the IP header.

Optionally, the processing identification information and the detection header are distributed, between the MAC header and the IP header, towards the MAC header and away from the MAC header, and the processing identification information and the detection header are adjacent to each other.

Optionally, the processing identification information includes an indication identifier and a detection identifier, the indication identifier indicates the second network device to process the detection identifier, and the detection identifier indicates the second network device to process the detection header.

Optionally, the indication identifier and the detection identifier are distributed, between the MAC header and the detection header, towards the MAC header and away from the MAC header, and the indication identifier and the detection identifier are adjacent to each other.

Optionally, the detection header is an IFIT header.

According to the technical solutions provided, because the detection header is the IFIT header, in-situ flow telemetry of transmission performance of a service flow can be implemented. This helps improve accuracy of a detection result.

Optionally, the second network device is an edge network device in a second network domain. In other words, the second network device belongs to the second network domain and the second network device is located at an edge of the second network domain.

According to the technical solutions provided, the first network device that belongs to the first network domain and is located at the edge of the first network domain obtains, based on the received first packet including the detection header, the second packet including the processing identification information and the detection header, and sends the second packet to the second network device that belongs to the second network domain and is located at the edge of the second network domain. After receiving the second packet, the second network device processes the detection header in the second packet based on the indication of the processing identification information in the second packet, to detect, based on the detection header, the transmission performance of the service flow in which the first packet is located. In this way, transmission performance of a service flow transmitted across network domains is detected.

Optionally, the first network device is a tail node device of a first tunnel that belongs to the first network domain, the second network device is a head node device of a second tunnel that belongs to the second network domain, and the first tunnel and the second tunnel each are a segment of a tunnel on the transmission path.

Optionally, at least one of the first network domain and the second network domain is a VPN. For example, the first network domain and the second network domain are both VPNs, and the first tunnel and the second tunnel are both VPN tunnels.

According to the technical solutions provided, because at least one of the first network domain and the second network domain is a VPN, transmission performance of a service flow between a device in the VPN and a device outside the VPN can be detected, for example, transmission performance of a service flow transmitted across VPNs can be detected. This helps improve flexibility of detection of transmission performance of a service flow, and scenarios are wide.

Optionally, the method further includes: The second network device enables a capability of identifying the processing identification information and the detection header that are carried in a packet received through a second interface of the second network device.

Correspondingly, that a second network device receives a second packet sent by a first network device includes: The second network device receives, through the second interface of the second network device, the second packet sent by the first network device.

According to the technical solutions provided, the second network device enables the capability of identifying the processing identification information and the detection header that are carried in the packet received through the second interface of the second network device, so that after receiving the second packet through the second interface, the second network device can identify the processing identification information and the detection header that are carried in the second packet, to process the detection header based on the indication of the processing identification information, and detect, based on the detection header, the transmission performance of the service flow in which the first packet is located.

According to a third aspect, a detection packet transmission apparatus is provided. The detection packet transmission apparatus includes modules configured to perform the method provided in any one of the first aspect or the optional manners of the first aspect. The modules may be implemented based on software, hardware, or a combination of software and hardware, and may be randomly combined or divided based on a specific implementation.

According to a fourth aspect, a detection packet transmission apparatus is provided. The detection packet transmission apparatus includes modules configured to perform the method provided in any one of the second aspect or the optional manners of the second aspect. The modules may be implemented based on software, hardware, or a combination of software and hardware, and may be randomly combined or divided based on a specific implementation.

According to a fifth aspect, a detection packet transmission apparatus is provided and includes a memory and a processor.

The memory is configured to store a computer program.

The processor is configured to execute the computer program stored in the memory, to enable the transmission apparatus to perform the detection packet transmission method provided in any one of the first aspect or the optional manners of the first aspect, or perform the detection packet transmission method provided in any one of the second aspect or the optional manners of the second aspect.

According to a sixth aspect, a computer-readable storage medium is provided. The computer-readable storage medium stores a computer program. When the computer program is executed, the detection packet transmission method provided in any one of the first aspect or the optional manners of the first aspect is implemented, or the detection packet transmission method provided in any one of the second aspect or the optional manners of the second aspect is implemented.

According to a seventh aspect, a computer program product is provided. The computer program product includes a program or code. When the program or code is executed, the detection packet transmission method provided in any one of the first aspect or the optional manners of the first aspect is implemented, or the detection packet transmission method provided in any one of the second aspect or the optional manners of the second aspect is implemented.

According to an eighth aspect, a chip is provided. The chip includes a programmable logic circuit and/or program instructions. When the chip is run, the chip is configured to implement the detection packet transmission method provided in any one of the first aspect or the optional manners of the first aspect, or implement the detection packet transmission method provided in any one of the second aspect or the optional manners of the second aspect.

According to a ninth aspect, a detection packet transmission system is provided and includes: a first network device and a second network device.

The first network device includes the detection packet transmission apparatus provided in the third aspect, and the second network device includes the detection packet transmission apparatus provided in the fourth aspect. Alternatively, at least one of the first network device and the second network device includes the detection packet transmission apparatus provided in the fifth aspect.

Optionally, the first network device is an edge network device in a first network domain, the second network device is a next-hop device of the first network device on a transmission path of a service flow in which a first packet is located, and the second network device does not belong to the first network domain.

Optionally, the second network device is an edge network device in a second network domain.

Optionally, at least one of the first network domain and the second network domain is a VPN.

The technical solutions provided bring the following beneficial effects:

According to the detection packet transmission method, apparatus, and system provided, a first network device is an edge network device in a first network domain, a second network device is a next-hop device of the first network device on a transmission path of a service flow in which a first packet is located, and the second network device does not belong to the first network domain. After receiving the first packet including a detection header, the first network device obtains, based on the first packet, a second packet including processing identification information and the detection header, and sends the second packet to the second network device, where the detection header indicates a network device to detect, based on the detection header, transmission performance of the service flow in which the first packet is located, and the processing identification information indicates the second network device to process the detection header. After receiving the second packet, the second network device processes the detection header in the second packet based on the processing identification information in the second packet, to detect, based on the detection header, the transmission performance of the service flow in which the first packet is located. In this way, transmission performance of a service flow between the first network device in the first network domain and the second network device outside the first network domain is detected. For example, transmission performance of a service flow transmitted across network domains is detected. This helps improve flexibility of detection of transmission performance of a service flow, and scenarios are wide.

DETAILED DESCRIPTION

The following further describes in detail implementations of this disclosure with reference to accompanying drawings.

Before the technical solutions in embodiments are described, a scenario of embodiments is first described.

The technical solutions provided in embodiments are applied to a communication network. The communication network includes a plurality of interconnected network devices. Optionally, the communication network further includes at least one controller, and each controller is connected to at least one network device, to control the at least one network device. The communication network is, for example, a data center network (DCN), a metropolitan area network, a wide area network, a campus network, or the like.

In embodiments, the communication network includes at least one network domain, each network domain includes at least one network device in the communication network, and each network domain includes an edge network device, and may further include a core network device. The edge network device is, for example, a provider edge (PE) device, and the core network device is, for example, a provider (P) device. Optionally, each network domain further includes a controller, and the controller in each network domain is configured to control a network device in the network domain. The network domain may be, for example, a VPN. Herein, an example in which the network domain is a VPN is used for description. When the communication network includes at least two VPNs, the at least two VPNs may be in a back-to-back (OptionA) relationship, or networking between the at least two VPNs is OptionA networking. In another embodiment, the at least two VPNs may be in another relationship. This is not limited in embodiments.

Figure 1:
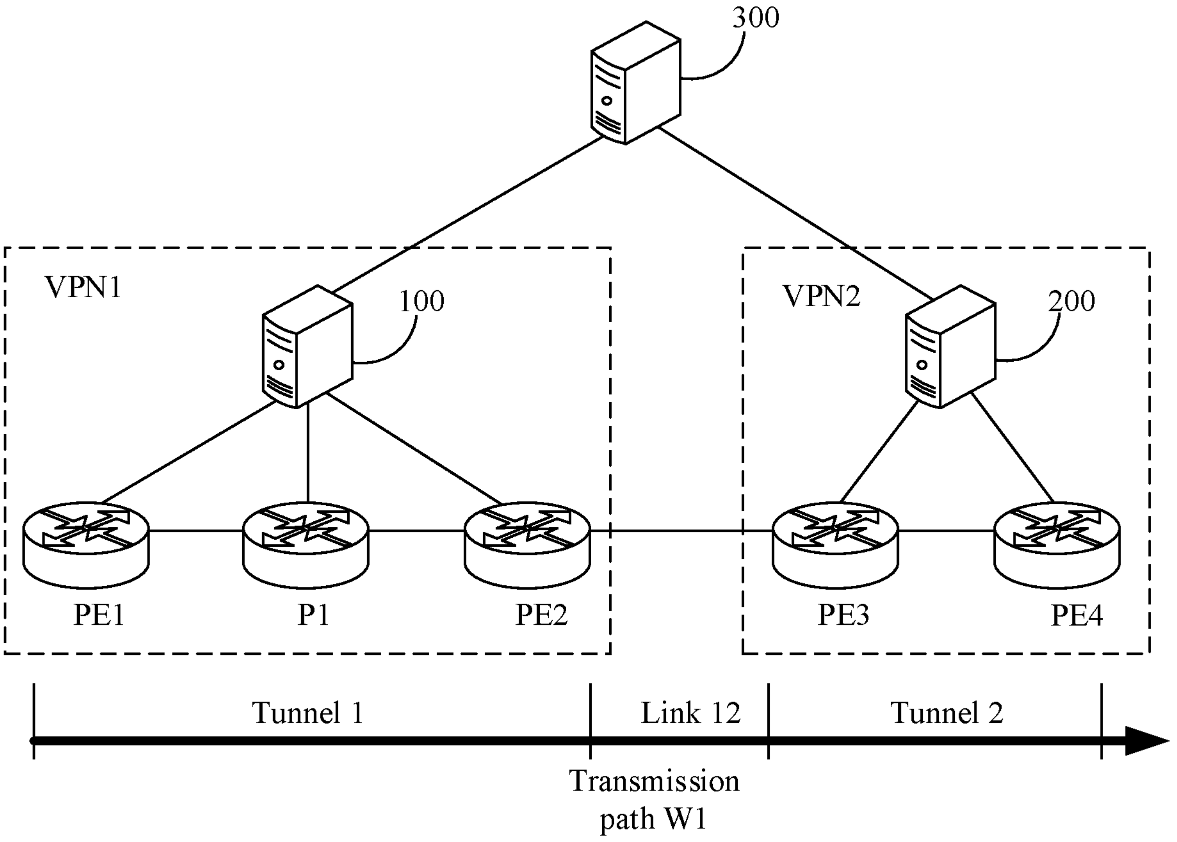
FIG. 1 is a schematic diagram of a communication network according to an embodiment.

For example, FIG. 1 is a schematic diagram of a communication network according to an embodiment. In FIG. 1, an example in which a network domain is a VPN is used for description. As shown in FIG. 1, the communication network includes network devices PE1 to PE4, P1, and controllers 100 to 300, and the communication network includes two network domains: VPN1 and VPN2, which are in an OptionA relationship. As shown in FIG. 1, PE1, PE2, P1, and the controller 100 are all located in VPN1, both PE1 and PE2 are edge network devices of VPN1, P1 is a core network device of VPN1, and the controller 100 is configured to control network devices (including PE1, PE2, and P1) in VPN1. PE3, PE4, and the controller 200 are all located in VPN2, PE3 and PE4 are all edge network devices of VPN2, and the controller 200 is configured to control network devices (including PE3 and PE4) in VPN2. The controller 300 is located outside VPN1 and VPN2. The controller 300 is configured to control the controller 100 and the controller 200, to control PE1 to PE4 and P1 by using the controller 100 and the controller 200.

The controllers (for example, the controllers 100 to 300) are a brain of a future cloud-based network, which integrates network management, service control, network analysis, and other functions, and is a core enabling system for implementing network resource pooling, network connection automation and self-optimization, and operation and maintenance automation. The controller may be a functional module deployed in a server, or a server, or a server cluster including several servers, or a cloud computing service center. The server is also referred to as a servo, and is a device providing a computing service. The server needs to respond to and process a service request to provide reliable services. Therefore, usually, the server needs to be capable of undertaking and ensuring services, and needs to have a strong processing capability, high stability, high reliability, high security, scalability, and manageability. In embodiments, the server may be an x86-based server, which is also referred to as a complex instruction set computer (CISC) architecture-based server, commonly referred to as a personal computer (PC) server. The x86-based server is a server that uses an Intel processor chip or another x86 instruction set-compatible processor chip and a Windows operating system based on a PC architecture. The x86-based server has advantages of cost-effectiveness, compatibility, and the like.

In a possible implementation of embodiments, some or all of the controllers 100 to 300 are functional modules deployed in one server. For example, the controllers 100 to 300 are three functional modules deployed in a same server. Alternatively, the controllers 100 to 200 are two functional modules deployed in a same server, and the controller 300 is one functional module deployed in another server. In another possible implementation of embodiments, some or all of the controllers 100 to 300 each are a server. For example, the controllers 100 to 300 each are a server. Alternatively, the controllers 100 to 200 each are a server, and the controller 300 is a functional module deployed in another server. In still another possible implementation of embodiments, some or all of the controllers 100 to 300 each are a server cluster. For example, the controllers 100 to 300 each are a server cluster. Alternatively, the controllers 100 to 200 belong to a server cluster, and the controller 300 belongs to another server cluster. This is not limited in embodiments.

The network device (for example, PE1 to PE4, and P1) may be a device, such as a switch, a router, a virtual switch, a virtual router, or the like, configured to forward services in the communication network. The router is a hardware device that connects two or more networks and functions as a gateway between the networks. The router is a network device that can read a destination address in a packet and determine how to transmit the packet based on the destination address. The router can understand different protocols, such as an Ethernet protocol used by a local area network, a Transmission Control Protocol (TCP)/IP used by the internet, or the like. In this way, the router can analyze destination addresses of packets transmitted from different types of networks and translate a non-TCP/IP address into a/an TCP/IP address, or vice versa. Then, the router transmits, through an optimal transmission path based on a selected routing algorithm, the packet to a device corresponding to the destination address. Therefore, the router can connect a non-TCP/IP network to the internet. In embodiments, PE1 to PE4 and P1 may be network devices of a same type. For example, PE1 to PE4 and P1 are all routers. Alternatively, PE1 to PE4 and P1 may be network devices of different types. For example, some network devices of PE1 to PE4 and P1 are routers, and the other network devices are switches. This is not limited in embodiments.

In some implementation scenarios, the VPN described in embodiments may also be referred to as a VPN domain, a detection domain, or a management domain. For example, as shown in FIG. 1, VPN1 and VPN2 each are a VPN domain, a detection domain, or a management domain. The controller 100 is an intra-domain controller of VPN1, the controller 200 is an intra-domain controller of VPN2, and the controller 300 may be an end-to-end (E2E) controller of VPN1 and VPN2. In addition, the communication network shown in FIG. 1 is merely used as an example, and is not used for limiting the technical solutions in embodiments. During actual implementation, a quantity of network devices, a quantity of controllers, a quantity of VPNs, and a relationship between the VPNs in the communication network may be configured as required. The communication network may further include another device such as a workstation or the like. In addition, the communication network may include a plurality of different types of network domains. For example, in FIG. 1, an example in which two network domains in the communication network are both VPNs is used for description. In another embodiment, a same communication network may include a VPN, or may include another type of network domain. This is not limited in embodiments.

The communication network includes a transmission path of a service flow, and a detection packet that belongs to the service flow may be transmitted over the transmission path of the service flow, to detect transmission performance of the service flow. The detection packet that belongs to the service flow may be obtained by encapsulating a detection header in a service packet that belongs to the service flow. For example, the detection packet is obtained by encapsulating, in the service packet that belongs to the service flow, the detection header and detection indication information indicating the detection header. The detection header is, for example, an IFIT header. Alternatively, in some embodiments, the detection header and the detection indication information are collectively referred to as an IFIT header (in other words, the detection indication information may be included in the detection header). This is not limited in embodiments. The transmission path is also referred to as a forwarding path.

According to a service transmission requirement, the transmission path of the service flow may cross network domains (for example, VPNs). For example, a network domain is a VPN. Some path segments (where a path segment refers to a segment on the transmission path) on the transmission path of the service flow are located in the VPN (for example, VPN1), and other path segments are located outside the VPN (for example, VPN1), so that the transmission path of the service flow crosses VPNs. A path segment located outside a VPN (for example, VPN1) may be located in another VPN (for example, VPN2). Alternatively, a path segment located outside the VPN (for example, VPN1) may not be located in any VPN, but may be located in another type of network domain. This is not limited in embodiments.

Optionally, a path segment that is on the transmission path and that is located in a network domain (for example, a VPN) is a tunnel, and the tunnel is, for example, but is not limited to: a segment routing traffic engineering (SR-TE) tunnel, a Resource Reservation Protocol-Traffic Engineering (RSVP-TE) tunnel, a segment routing (SR) policy tunnel, a Segment Routing over Internet Protocol version 6 (SRv6) policy tunnel, a label-switched path (LSP) tunnel, a segment routing best effort (SR-BE) tunnel, or an SRv6 best effort (BE) tunnel. The tunnel includes a head node device, a tail node device, and a transit node device (or referred to as an intermediate node device) located between the head node device and the tail node device. In some implementation scenarios, the head node device is referred to as an ingress device or a head node, the tail node device is referred to as an egress device or a tail node, and the transit node device is referred to as a transit device or a transit node. Based on a length of the tunnel, the tunnel may include only the head node device and the tail node device, and does not include the transit node device.

For example, as shown in FIG. 1, a transmission path W1 of the service flow includes a tunnel 1 located in VPN1, a tunnel 2 located in VPN2, and a link 12 located between VPN1 and VPN2. PE1 is a head node device of the tunnel 1, PE2 is a tail node device of the tunnel 1, and P1 is a transit node device of the tunnel 1. PE3 is a head node device of the tunnel 2, and PE4 is a tail node device of the tunnel 2. The link 12 is a link between PE2 and PE3, and the link 12 may be a direct link or an indirect link between PE2 and PE3. The tunnel 1, the tunnel 2, and the link 12 are path segments on the transmission path W1. Each of the tunnel 1 and the tunnel 2 may be an SR-TE tunnel, an RSVP-TE tunnel, an SR policy tunnel, an SRv6 policy tunnel, an LSP tunnel, an SR-BE tunnel, or an SRv6 BE tunnel. In addition, the tunnel 1 and the tunnel 2 may be of a same type. For example, both the tunnel 1 and the tunnel 2 are SRv6 policy tunnels. Alternatively, the tunnel 1 and the tunnel 2 may be of different types. For example, the tunnel 1 is an SRv6 policy tunnel, and the tunnel 2 is an SR-TE tunnel. This is not limited in embodiments.

An IFIT technology is a highly sensitive in-situ flow telemetry technology. A detection principle of the IFIT technology is as follows: An IFIT header is inserted into a service packet (for example, an IFIT header and detection indication information indicating the IFIT header are inserted into a service packet), and transmission performance of a service flow in which the service packet is located is detected based on the IFIT header in the service packet. The IFIT header carries only basic field information, which ensures that the IFIT header brings minimum expansion to the service packet. The IFIT technology detects transmission performance of a service flow based on a real service packet, so that the transmission performance of the service flow detected based on the IFIT technology can reflect actual transmission performance of the service flow, and the IFIT technology has high detection sensitivity.

The transmission path of the service flow includes a tunnel in a network domain (for example, a VPN). In the IFIT technology, after a head node device of the tunnel receives a service packet, if information about the service packet matches information about a to-be-detected service flow, the head node device generates a flow ID for the service flow in which the service packet is located, and inserts an IFIT header (for example, inserts an IFIT header and detection indication information indicating the IFIT header) into the service packet, and records the flow identifier in the IFIT header to obtain an IFIT packet. Then, the head node device forwards the IFIT packet to a transit node device of the tunnel, and the transit node device forwards the IFIT packet to a tail node device of the tunnel. The tail node device removes the IFIT header (for example, the IFIT header and the detection indication information indicating the IFIT header) from the IFIT packet to obtain an original service packet, and forwards the original service packet to a next-hop device of the tail node device on the transmission path. The next-hop device is located outside the network domain (for example, the VPN) in which the tunnel is located. In the foregoing process, the head node device, the transit node device, and the tail node device separately detect, based on the IFIT header of the IFIT packet, the transmission performance of the service flow in which the IFIT packet is located. For example, the head node device, the transit node device, and the tail node device separately collect, based on the flow ID in the IFIT header, statistics on performance information of the service flow in which the IFIT packet is located, and send the performance information of the service flow to the controller. The controller determines the transmission performance of the service flow based on the received performance information of the service flow.

However, because the tail node device of the tunnel forwards the original service packet to the next-hop device of the tail node device after removing the IFIT header from the IFIT packet, a service packet transmitted from the network domain (for example, the VPN) does not carry the IFIT header. As a result, transmission performance of the service flow between the tail node device and the next-hop device of the tail node device cannot be detected. In other words, transmission performance of a service flow between a device in a network domain (for example, a VPN) and a device outside the network domain (for example, a VPN) cannot be detected. Therefore, transmission performance of a service flow transmitted across network domains cannot be detected. For example, in a VPN OptionA scenario, a service flow often needs to be transmitted across VPNs. The foregoing IFIT technology cannot be used to detect transmission performance of the service flow transmitted across the VPNs. Therefore, a scenario of the foregoing IFIT technology is limited, and flexibility is poor.

In view of the foregoing problem existing in the current IFIT technology, embodiments provide a detection packet transmission method, apparatus, and system. In the technical solutions provided in embodiments, after receiving a first packet including a detection header (for example, an IFIT header), a first network device that is on a transmission path of a service flow, belongs to a first network domain, and is located at an edge of the first network domain (for example, a tail node device of a first tunnel in the first network domain) obtains, based on the first packet, a second packet including processing identification information and the detection header, and sends the second packet to a next-hop device that is located outside the first network domain and is on the transmission path, so that the next-hop device detects, based on the processing identification information and the detection header that are in the second packet, transmission performance of the service flow in which the first packet is located. In this way, transmission performance of a service flow between a device in the first network domain and a device outside the first network domain is detected. For example, transmission performance of a service flow transmitted across network domains (for example, VPNs) in an end-to-end manner is detected. Scenarios are wide, and flexibility is poor. The following describes in detail the technical solutions in embodiments with reference to the accompanying drawings.

In embodiments, a detection packet includes a detection header, and the detection header may be an IFIT header. For ease of understanding, the IFIT header is used as an example herein to describe the detection header in embodiments.

Figure 2:
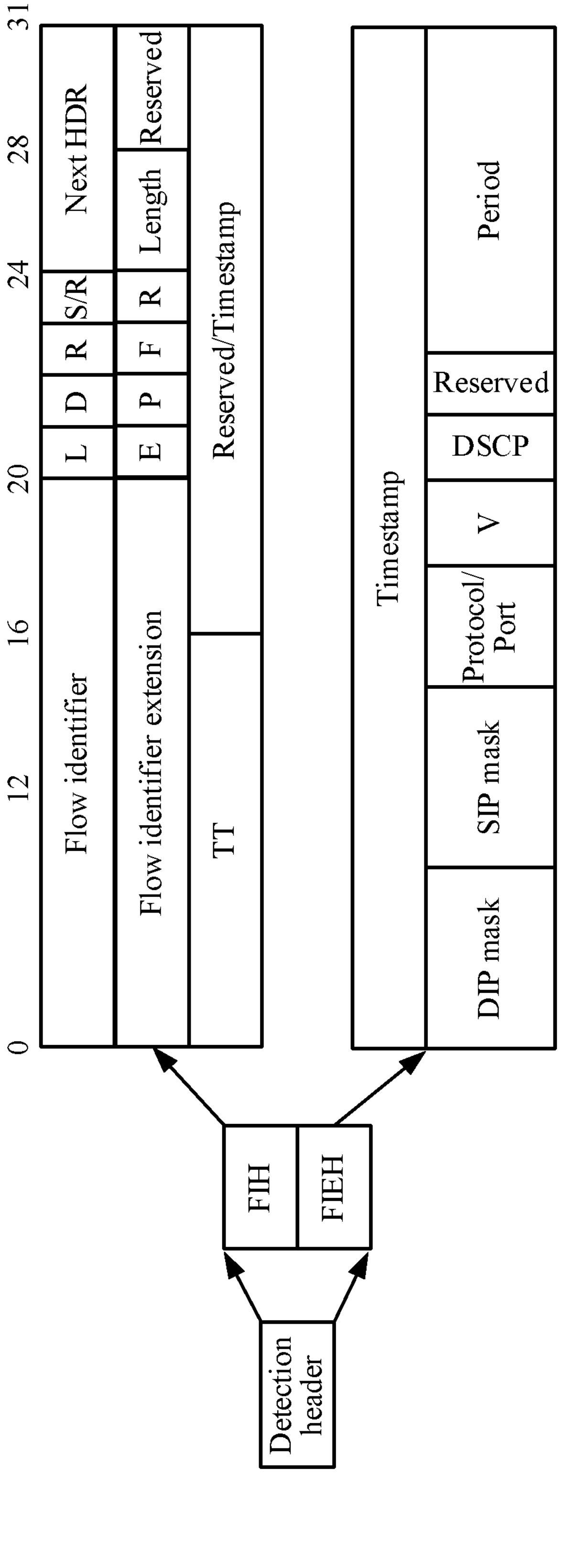
FIG. 2 is a schematic diagram of a detection header according to an embodiment.

FIG. 2 is a schematic diagram of a detection header according to an embodiment. Refer to FIG. 2. The detection header includes: a flow instruction header (FIH) and a flow instruction extension header (FIEH). The FIEH is an optional part in the detection header.

As shown in FIG. 2, the FIH includes a flowID field, an L field, a D field, an R field, an S/R field, a next header (HDR) field, a flow identifier extension (Ext) field, an E field, a P field, a forward (F) field, an R field, a length field, a reserved field, a trace type (TT) field, and a reserved/timestamp field. The flow identifier field and the flow identifier extension field are used for recording a flow identifier. The L field is used for recording a packet loss coloring flag (where the L field is also referred to as a packet loss flag field or a packet loss flag bit). The D field is used for recording a delay measurement flag (where the D field is also referred to as a delay flag field or a delay flag bit). The S/R field is used for recording whether a label in a flow instruction indicator (FII) in a detection packet is a stack bottom label. If the label in the FII is the stack bottom label, a value in the S/R field is R. If the label in the FII is not the stack bottom label, a value in the S/R field is S. The next HDR field is used for recording a protocol type (or referred to as an extension header type), and a standard mode is 9. The E field is used for recording an E2E detection mode or a hop-by-hop detection mode. When a value in the E field is 1, it indicates the E2E detection mode. The P field is used in an Internet Protocol version 4 (IPv4) detection scenario, and used for recording whether a mismatch exists. The F field is used for recording a forward flow flag. When a value in the F field is 1, it indicates a forward flow. The TT field is used for recording a type of the flow identifier extension field, such as a timestamp, automatic reverse flow creation, or the like. The reserved/timestamp field is used for recording a packet-by-packet delay.

As shown in FIG. 2, the FIEH includes a timestamp field, a destination IP (DIP) mask field, a source IP (SIP) mask field, a protocol/port (pro/ports) field, a V field, a differentiated services code point (DSCP) field, a reserved field, and a period field. The timestamp field is used for recording a packet-by-packet delay. The DIP mask field is used for recording a length of a DIP mask for automatic backward flow learning. The SIP mask field is used for recording a length of a SIP mask for automatic backward flow learning. The protocol/port field is used for recording a protocol number, a source port number, and a destination port number. The V field is used for recording an enabling flag for backward flow learning. The DSCP field is used for recording a DSCP priority. The period field is used for recording a detection period (or a reporting period of a detection result), and a value in the period field may be 2, 3, 4, or 5, where 2 indicates that the detection period is 10 seconds, 3 indicates that the detection period is 30 seconds, 4 indicates that the detection period is 60 seconds, and 5 indicates that the detection period is 300 seconds.

In embodiments, when inserting a detection header into a service packet, a head node device of a tunnel may further insert, into the service packet, detection indication information indicating the detection header, so that a network device can determine the detection header based on the detection indication information, and detect transmission performance of a service flow based on the detection header. In a possible implementation, when inserting the detection header into the service packet, the head node device of the tunnel inserts an FII into the service packet, and records the detection indication information in the FII. Optionally, in a multi-protocol label switching (MPLS) scenario, the FII includes an FII label field, an experimental bits (EXP) field, an S field, a time-to-live (TTL) field, and the like. The FII label field is used for recording a stack bottom label. When a value in the S field is 1, the FII label field has to be at a stack bottom. A value in the FII label field may be 12. The value in the FII label field is the detection indication information, which indicates a subsequent detection header (for example, an IFIT header). In an SRv6 scenario, the FII includes a detection type field (for example, an IFIT type field), a length field, and a reserved field. A value in the detection type field (for example, the IFIT type field) may be 130. The value in the detection type field (for example, the IFIT type field) is the detection indication information, which indicates a subsequent detection header (for example, an IFIT header).

The service packet into which the detection indication information and the detection header are inserted is a detection packet. In other words, the detection packet is obtained after the detection indication information and the detection header are inserted into the service packet. The following describes the detection packet in embodiments by using an MPLS scenario and an SRv6 scenario separately as examples.

Figure 3:
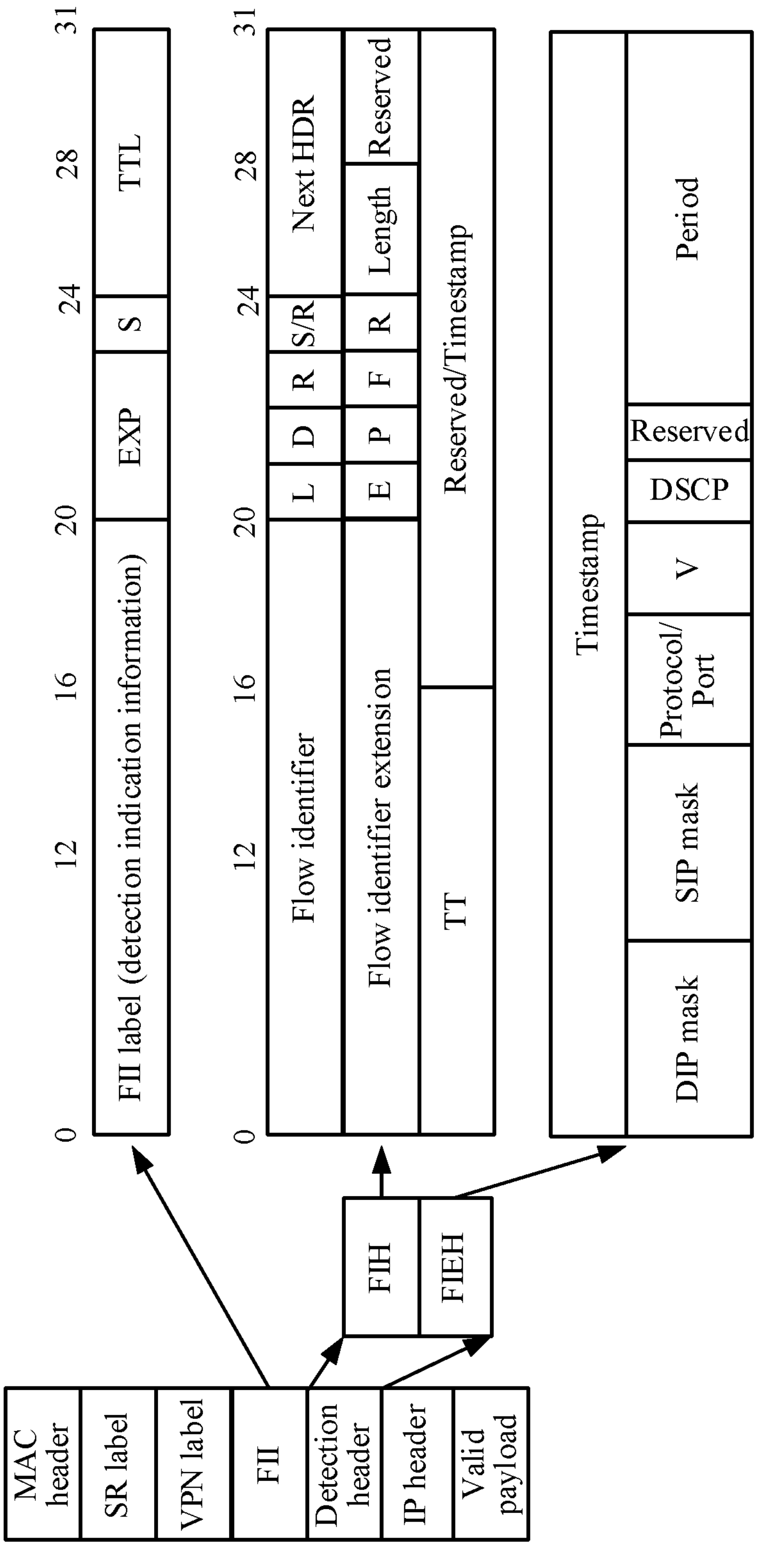
FIG. 3 is a schematic diagram of a detection packet according to an embodiment.

FIG. 3 is a schematic diagram of a detection packet according to an embodiment. In FIG. 3, an example of the detection packet in an MPLS scenario is used for description. As shown in FIG. 3, the detection packet includes: a valid payload, an IP header, a detection header (for example, an IFIT header), an FII, a VPN label, a segment routing (SR) label, and a MAC header. The detection header and the FII are detection-related content inserted into a service packet, for example, detection-related content inserted into a service packet by a head node device of a tunnel. The FII includes an FII label field, an EXP field, an S field, and a TTL field. A value in the FII label field is detection indication information, and the detection indication information indicates a detection header. For content of the detection header, refer to FIG. 2 and related descriptions thereof. Details are not described herein again. The VPN label and the SR label in the detection packet shown in FIG. 3 are tunnel information inserted by the head node device of the tunnel into the service packet. For content of the tunnel information, details are not described herein again.

Figure 4:
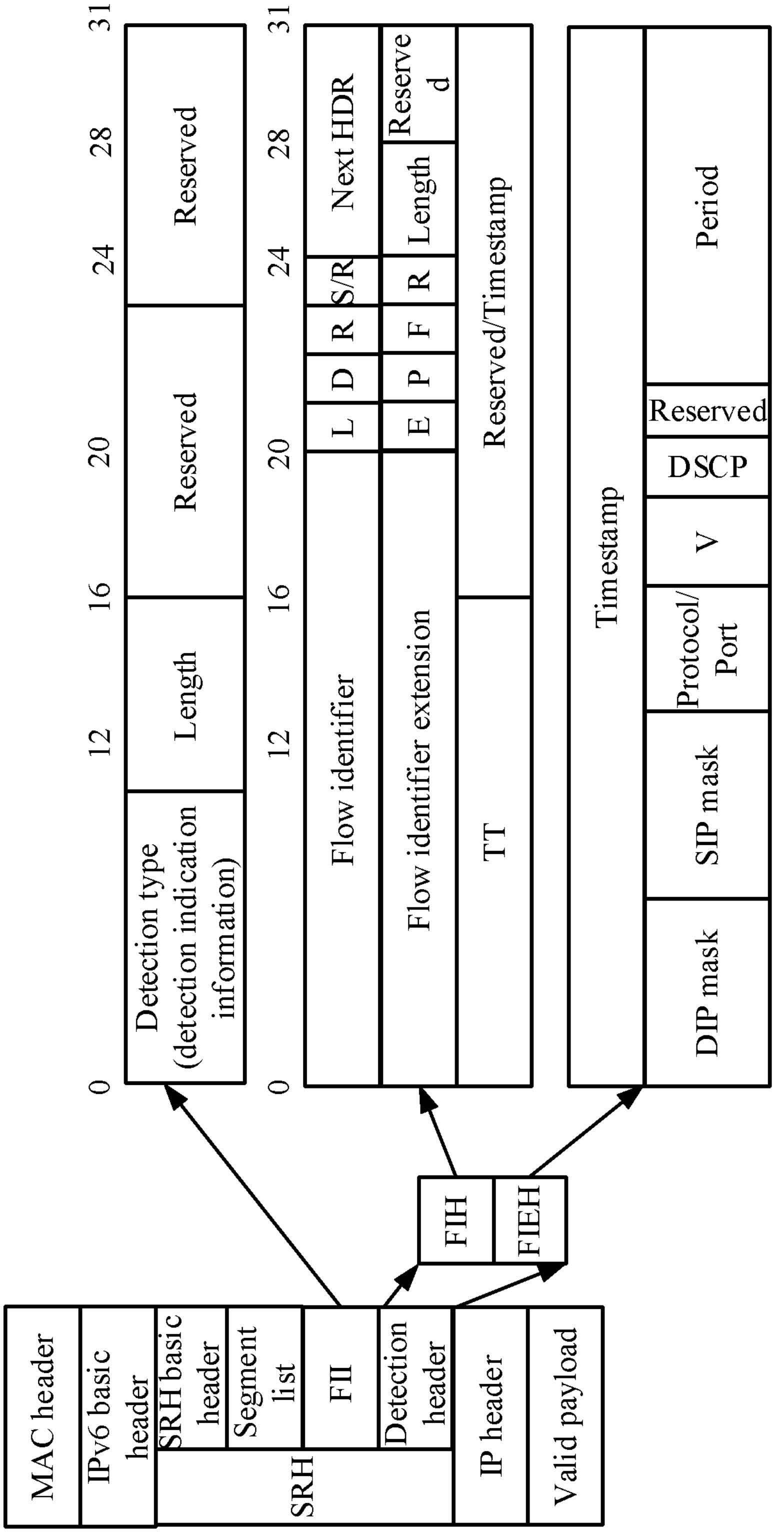
FIG. 4 is a schematic diagram of another detection packet according to an embodiment.

FIG. 4 is a schematic diagram of another detection packet according to an embodiment. In FIG. 4, an example of the detection packet in an SRv6 scenario is used for description. As shown in FIG. 4, the detection packet includes: a valid payload, an IP header, a segment routing protocol header (SRH), a detection header, an FII, a segment list, an SRH basic header, an IPv6 basic header, and a MAC header. The detection header and the FII are detection-related content inserted into a service packet, for example, detection-related content inserted into the service packet by a head node device of a tunnel. The FII includes a detection type field (for example, an IFIT type field), a length field, and a reserved field. A value in the detection type field is detection indication information, and the detection indication information indicates the detection header. For content of the detection header, refer to FIG. 2 and related descriptions thereof. Details are not described herein again. The SRH, the segment list, and the SRH basic header in the detection packet shown in FIG. 4 may be tunnel information inserted by the head node device of the tunnel into the service packet. For content of the tunnel information, details are not described herein again.

It should be noted that, detection packets shown in FIG. 3 and FIG. 4 are merely examples, but are not intended to limit the technical solutions in embodiments. During actual application, content, a format, and the like of the detection packet may be flexibly set and adjusted as required. For example, in some embodiments, detection indication information may be in a detection header. In this way, the FII shown in FIG. 3 and FIG. 4 may be merged into the detection header. This is not limited in embodiments.

The following describes an embodiment of a detection packet transmission method.

Figure 5:
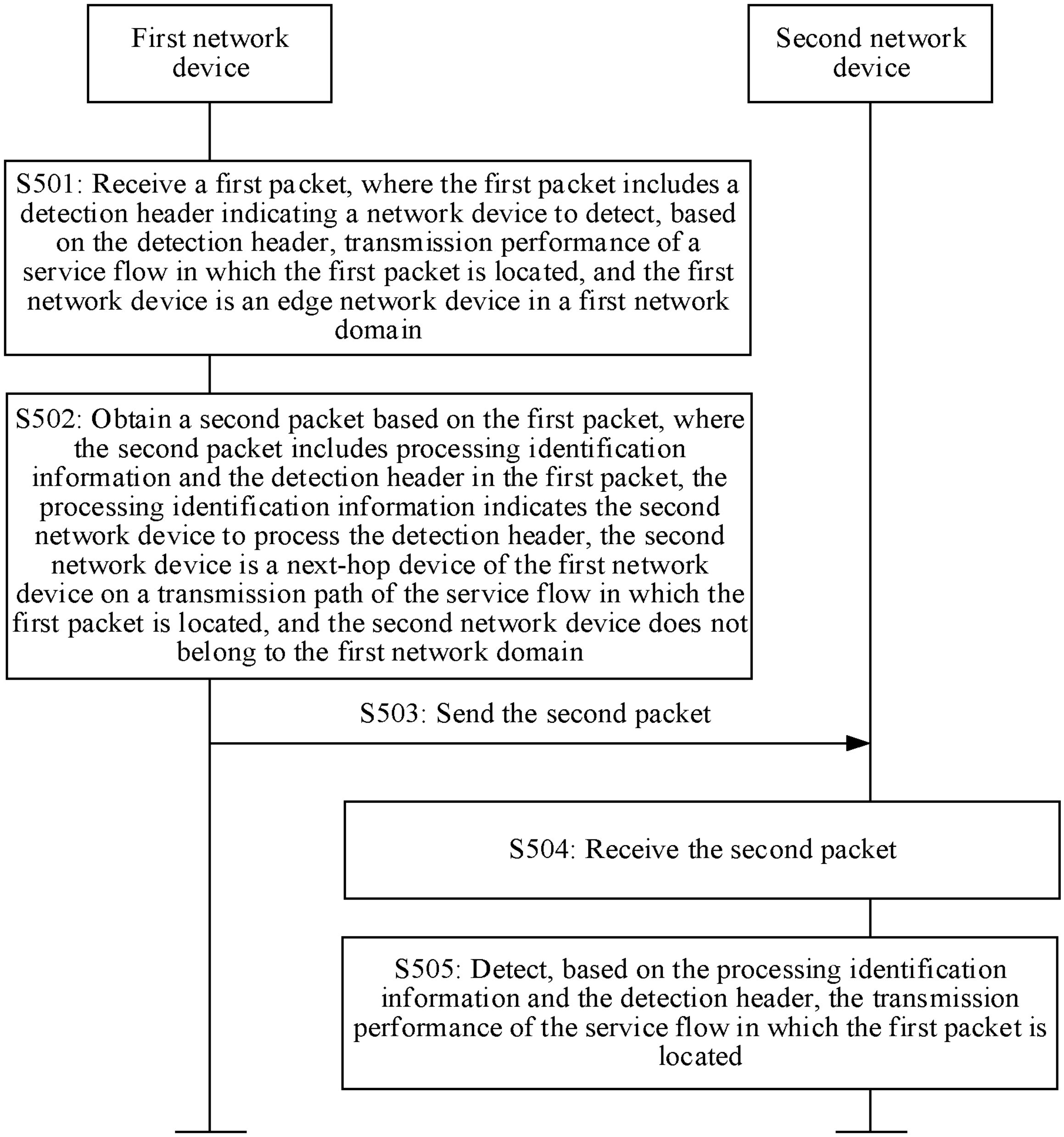
FIG. 5 is a flowchart of a detection packet transmission method according to an embodiment.

FIG. 5 is a flowchart of a detection packet transmission method according to an embodiment. The method is applicable to a system including a first network device and a second network device. Both the first network device and the second network device are located on a transmission path of a service flow, and the second network device is a next-hop device of the first network device. The first network device is an edge network device in a first network domain (to be specific, the first network device belongs to the first network domain and the first network device is located at an edge of the first network domain), and the second network device does not belong to the first network domain. Optionally, the second network device is an edge network device in a second network domain (to be specific, the second network device belongs to the second network domain and the second network device is located at an edge of the second network domain). For example, at least one of the first network domain and the second network domain is a VPN. For example, as shown in FIG. 1, the first network domain is VPN1, the second network domain is VPN2, the first network device is PE2 that belongs to VPN1, and the second network device is PE3 that belongs to VPN2. Refer to FIG. 5. The method may include the following steps.

S501: The first network device receives a first packet, where the first packet includes a detection header indicating a network device to detect, based on the detection header, transmission performance of a service flow in which the first packet is located, and the first network device is the edge network device in the first network domain.

The first network device may receive the first packet from a previous-hop device of the first network device on the transmission path of the service flow in which the first packet is located, and the previous-hop device of the first network device belongs to the first network domain. Optionally, the previous-hop device of the first network device is a core network device in the first network domain, or the previous-hop device of the first network device is an edge network device in the first network domain. This is not limited in this embodiment. For ease of description, the service flow in which the first packet is located is referred to as a first service flow, the transmission path of the service flow in which the first packet is located is referred to as a first transmission path, and the previous-hop device of the first network device on the transmission path of the service flow in which the first packet is located is referred to as a third network device. In other words, the service flow in which the first packet is located and the first service flow are a same service flow, the transmission path of the service flow in which the first packet is located and the first transmission path are a same transmission path, and the previous-hop device of the first network device and the third network device are a same network device. For example, as shown in FIG. 1, the first network domain is VPN1, the first transmission path is the transmission path W1, the first network device is PE2, and the third network device is P1.

In a possible implementation of this embodiment, the transmission path (namely, the first transmission path) of the service flow in which the first packet is located includes at least one segment of a tunnel, each segment of the tunnel belongs to one network domain (for example, a VPN), and the first transmission path includes a first tunnel that belongs to the first network domain. The first network device may be a tail node device of the first tunnel, and the previous-hop device (namely, the third network device) of the first network device may be a head node device of the first tunnel or a transit node device of the first tunnel. For example, as shown in FIG. 1, the first transmission path is the transmission path W1, the transmission path W1 includes the tunnel 1 that belongs to VPN1 and the tunnel 2 that belongs to VPN2, the first network domain may be VPN1, the first tunnel may be the tunnel 1, the first network device is PE2, the third network device is P1, and the third network device is the transit node device of the tunnel 1.

In this embodiment, the first packet includes the detection header (for example, the detection header shown in FIG. 2), and the detection header indicates the network device to detect, based on the detection header, the transmission performance of the service flow (namely, the first service flow) in which the first packet is located. In a possible implementation, the first packet further includes detection indication information indicating the detection header, so that the network device determines the detection header based on the detection indication information, and detects transmission performance of the first service flow based on the detection header. The transmission performance is, for example, service-level agreement (SLA) performance, and the transmission performance of the service flow includes a number of lost packets in the service flow, a transmission delay of a packet in the service flow, and/or the like. The detection header in the first packet and the detection indication information indicating the detection header may be inserted by the head node device of the first tunnel into a received service packet, and the detection header carries a flow identifier of the first service flow. In other words, the head node device of the first tunnel inserts, into the received service packet, the detection header and the detection indication information indicating the detection header, to obtain the first packet. The detection header may be an IFIT header. For example, as shown in FIG. 1, the first tunnel is the tunnel 1, and the head node device of the first tunnel is PE1.

Optionally, after receiving a service packet, the head node device of the first tunnel detects whether information (for example, a 5-tuple or a 3-tuple) about the service packet matches information (for example, a 5-tuple or a 3-tuple) about a to-be-detected service flow. If the information about the service packet matches the information about the to-be-detected service flow, the head node device of the first tunnel generates a flow identifier for a service flow to which the service packet belongs, inserts, into the service packet, a detection header and detection indication information indicating the detection header, and records the flow identifier in the detection header to obtain the first packet. The service flow in which the first packet is located is the service flow in which the service packet is located, that is, the first service flow. The service packet may be a layer 2 (L2) packet, a layer 3 (L3) packet, an MPLS packet, an SR packet, or an SRv6 packet. Correspondingly, the first packet may be an L2 packet, an L3 packet, an MPLS packet, an SR packet, or an SRv6 packet. The first packet varies with a type of the first network domain. For example, if the first network domain is an MPLS network, the first tunnel is a tunnel of an MPLS type, and the first packet may be a detection packet shown in FIG. 3. For another example, if the first network domain is an SRv6 network, the first tunnel is a tunnel of an SRv6 type, and the first packet may be a detection packet shown in FIG. 4. The information about the to-be-detected service flow may be delivered by a controller to the head node device of the first tunnel, or may be configured (for example, manually configured) on the head node device of the first tunnel.

In this embodiment, the first packet further includes a MAC header, an IP header, a valid payload, tunnel information of the first tunnel, and the like. The MAC header refers to a header including MAC information (for example, a source MAC address and a destination MAC address). In some embodiments, a packet includes an Ethernet (ETH)

header, and the MAC information is located in the ETH header. The IP header refers to a header including IP information, and the IP header may be an Internet Protocol version 4 (IPv4) header or an Internet Protocol version 6 (IPv6) header. The valid payload in the first packet is, for example, service data or the like. Based on different tunnel types, the tunnel information of the first tunnel may be an MPLS-based label or an SRv6-based SID. The tunnel information of the first tunnel may be encapsulated by the head node device of the first tunnel in the first packet. For example, the head node device of the first tunnel encapsulates the tunnel information in the service packet, and inserts, into the service packet, the detection header and the detection indication information indicating the detection header, to obtain the first packet. Optionally, the first packet may alternatively be another packet, and the first packet may further include other content. For example, the first packet may be an IPv4 packet or an IPv6 packet, and the first packet may further include a virtual local area network (VLAN) identifier, indication information indicating the VLAN identifier, indication information indicating whether the IP header is an IPv4 header or an IPv6 header, and the like. The first packet is not limited in this embodiment.

S502: The first network device obtains a second packet based on the first packet, where the second packet includes processing identification information and the detection header in the first packet, the processing identification information indicates the second network device to process the detection header, the second network device is the next-hop device of the first network device on the transmission path of the service flow in which the first packet is located, and the second network device does not belong to the first network domain.

After receiving the first packet, the first network device may process the first packet, and determine a processed first packet as the second packet, to obtain the second packet based on the first packet. The second packet includes the processing identification information and the detection header in the first packet, and the processing identification information indicates the second network device to process the detection header, so that the second network device detects, based on the detection header, the transmission performance of the service flow in which the first packet is located. The second network device is the next-hop device of the first network device on the transmission path (namely, the first transmission path) of the service flow in which the first packet is located, and the second network device does not belong to the first network domain. In a possible implementation, the second network device is the edge network device in the second network domain. For example, the first transmission path includes a second tunnel that belongs to the second network domain, and the second network device is a head node device of the second tunnel. For example, as shown in FIG. 1, the second network domain is VPN2, the second tunnel is the tunnel 2, and the second network device is PE3.

In a possible implementation of this embodiment, the second packet further includes a MAC header and an IP header, and the processing identification information and the detection header are located between the MAC header and the IP header. For example, the processing identification information and the detection header are distributed, between the MAC header and the IP header, towards the MAC header and away from the MAC header, and the processing identification information and the detection header are adjacent to each other. In other words, the processing identification information is closer to the MAC header than the detection header, and the detection header is closer to the IP header than the processing identification information.

In a specific embodiment, the processing identification information may include an indication identifier and a detection identifier, where the indication identifier indicates the second network device to process the detection identifier, and the detection identifier indicates the second network device to process the detection header, so that the processing identification information in the second packet indicates the second network device to process the detection header in the second packet. The indication identifier and the detection identifier may be distributed, between the MAC header and the detection header, towards the MAC header and away from the MAC header, and the indication identifier and the detection identifier are adjacent to each other. In other words, the indication identifier is closer to the MAC header than the detection identifier, and the detection identifier is closer to the detection header than the indication identifier.

In a possible implementation, the second packet includes an Ethernet type (eth-type) field and a label field, the indication identifier is located in the Ethernet type field (in other words, a value in the Ethernet type field is the indication identifier), and the detection identifier is located in the label field (in other words, a value in the label field is the detection identifier). In a specific example, the second packet includes an FII, and the FII includes an FII label field (which corresponds to the first packet of an MPLS type) or a detection type field (for example, an IFIT field, which corresponds to the first packet of an SRv6 type). The label field used for carrying the detection identifier may be the FII label field or the detection type field in the FIT. In other words, the detection identifier is located in the FII label field (or the detection type field) in the FII of the second packet. For example, the indication identifier is 0x8847, and the indication identifier 0x8847 is used for representing (or indicating) that content after the indication identifier is the detection identifier (or the indication identifier 0x8847 is used for indicating that 0x8847 is followed by a label). For example, the detection identifier is 12, and the detection identifier 12 is used for representing (or indicating) that content after the detection identifier is the detection header (or the detection identifier 12 is used for indicating that the detection identifier 12 is followed by the detection header). In this embodiment, an example in which the indication identifier is 0x8847 and the detection identifier is 12 is used for description. Specific content of the indication identifier and the detection identifier may be flexibly set as required. The specific content of the indication identifier and the detection identifier is not limited in this embodiment.

Figure 6:
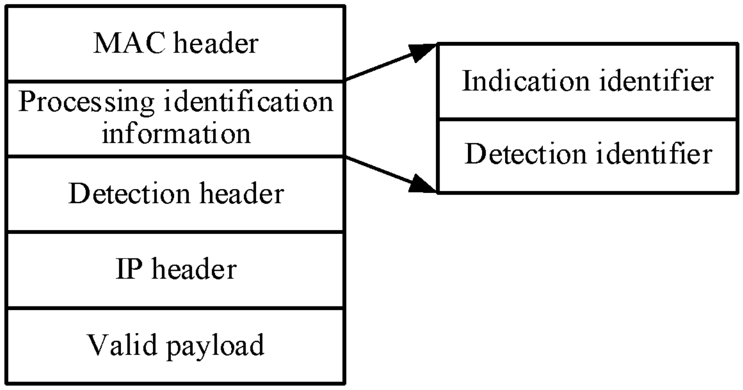
FIG. 6 is a schematic diagram of still another detection packet according to an embodiment.

In a possible implementation of this embodiment, that the first network device processes the first packet includes: The first network device removes the tunnel information (namely, the tunnel information of the first tunnel) and the detection indication information from the first packet, adjusts the detection header in the first packet between the MAC header and the IP header, and inserts the processing identification information between the MAC header and the detection header, so that the processing identification information includes the indication identifier and the detection identifier that are distributed towards the MAC header and away from the MAC header. Alternatively, as described above, the first packet includes the detection indication information, the detection indication information is located in an FII label field (or a detection type field) in an FII of the first packet, the second packet includes an FII, and the detection identifier (for example, 12) in the processing identification information is located in an FII label field (or a detection type field) in the FII of the second packet. That the first network device processes the first packet may include: The first network device removes the tunnel information (namely, the tunnel information of the first tunnel) from the first packet, deletes the detection indication information from the FII label field (or the detection type field) in the FII of the first packet (or deletes a value in the FII label field (or the detection type field) in the FII of the first packet), and records the detection identifier (for example, 12) in the FII label field (or the detection type field) in the FII of the first packet, adjusts the detection header and the FII in the first packet between the MAC header and the IP header, and inserts the indication identifier (for example, 0x8847) between the MAC header and the FIT. The indication identifier (for example, 0x8847) and the detection identifier (for example, 12) jointly form the processing identification information, and the processing identification information includes the indication identifier and the detection identifier that are distributed towards the MAC header and away from the MAC header. The first network device obtains the second packet after processing the first packet. For example, the second packet is shown in FIG. 6.

In this embodiment, the detection header in the second packet is the same as the detection header in the first packet. For example, the detection packet is the detection header shown in FIG. 2. As described above, the first packet may be the detection packet shown in FIG. 3 or FIG. 4. For ease of understanding a difference between the first packet and the second packet and an implementation in which the first network device obtains the second packet by processing the first packet, the following describes a second packet in an embodiment in FIG. 7.

Figure 7:
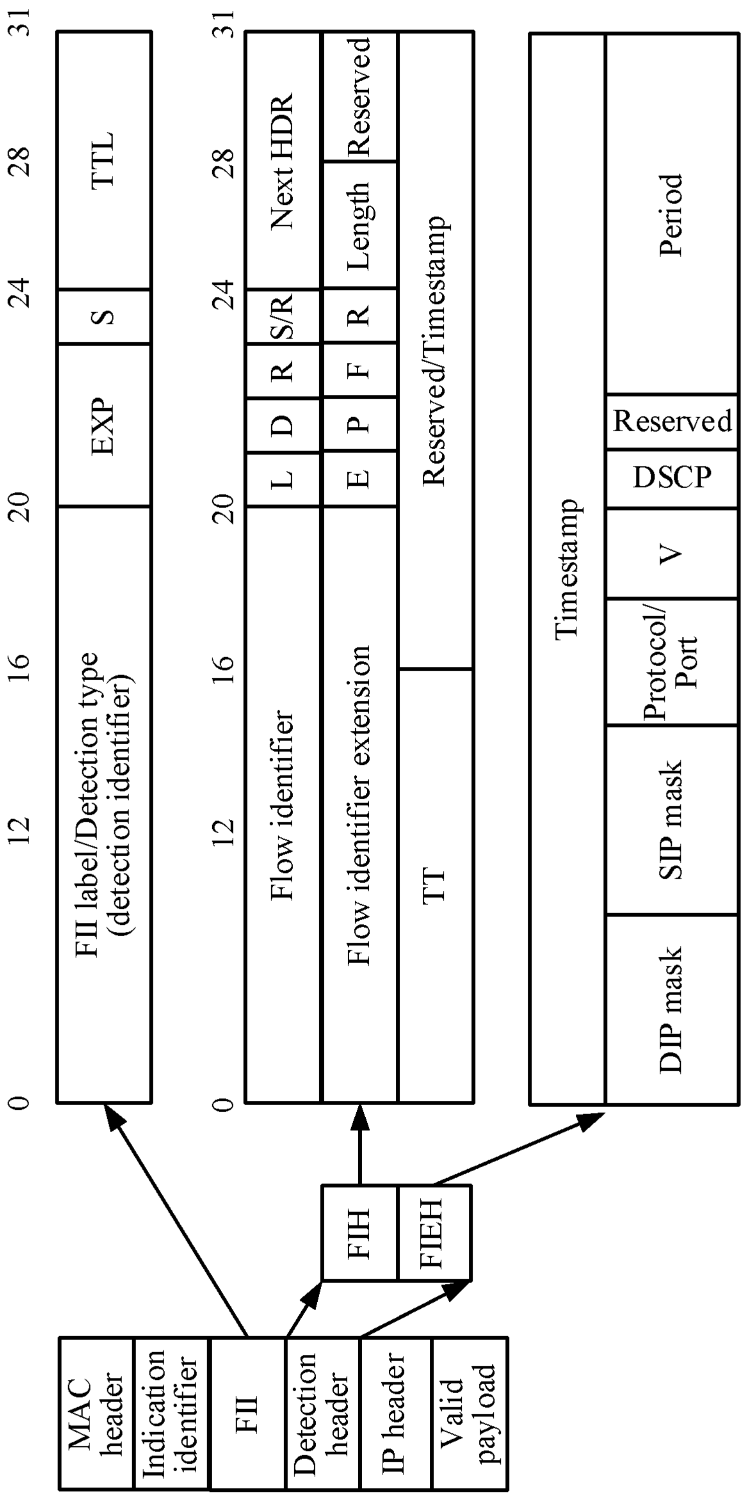
FIG. 7 is a schematic diagram of still yet another detection packet according to an embodiment.

For example, FIG. 7 is a schematic diagram of a second packet according to an embodiment. The second packet shown in FIG. 7 may be obtained based on a first packet of an MPLS type or a first packet of an SRv6 type. As shown in FIG. 7, the second packet includes a valid payload, an IP header, a detection header, an FII, an indication identifier (for example, 0x8847), and a MAC header. The FII includes an FII label/detection type field (where the FII label field corresponds to the first packet of the MPLS type; and the detection type field is, for example, an IFIT type field, and the IFIT type field corresponds to the first packet of the SRv6 type). A detection identifier (for example, 12) is located in the FII label/detection type field. In other words, a value in the FII label/detection type field is the detection identifier. The indication identifier (for example, 0x8847) and the detection identifier (for example, 12) in the FII label/detection type field form the processing identification information. The processing identification information indicates the second network device to process the detection header, and the detection header may be an IFIT header.

In this embodiment, the first packet may be shown in FIG. 3 (the first packet of the MPLS type) or FIG. 4 (the first packet of the SRv6 type), and the second packet shown in FIG. 7 may be obtained based on the first packet shown in FIG. 3 or FIG. 4. It can be learned by comparing FIG. 3 and FIG. 7 that, the first network device removes the tunnel information (for example, a VPN label, an SR label, and the like in FIG. 3) from the first packet, modifies the detection indication information in the FII label field in the FII of the first packet to the detection identifier, and inserts the indication identifier between the FII and the MAC header, to obtain the second packet. It can be learned by comparing FIG. 4 and FIG. 7 that, the first network device removes the tunnel information (for example, a segment list, an SRH basic header, an SRH, an IPv6 basic header, and the like in FIG. 4) from the first packet, modifies the detection indication information in the detection type field (for example, the IFIT field) in the FII of the first packet to the detection identifier, and inserts the indication identifier between the FII and the MAC header, to obtain the second packet.

It should be noted that, second packets shown in FIG. 6 and FIG. 7 are merely used as an example, but are not intended to limit the technical solutions in this embodiment. During actual application, content, a format, and the like of the second packet may be flexibly set and adjusted as required. The format and the content of the second packet are not specifically limited in this embodiment.

S503: The first network device sends the second packet to the second network device.

After obtaining the second packet, the first network device sends the second packet to the second network device over a link between the first network device and the second network device. Optionally, at least one interface is configured in the first network device, and the at least one interface includes a first interface. The first interface is used for communication between the first network device and the second network device (or the first interface is an interface that is on the first network device and that is used for connecting a link between the first network device and the second network device). The first network device may send the second packet to the second network device through the first interface, so that the second packet is transmitted to the second network device over the link between the first network device and the second network device. The first interface may be a VPN interface.

In a possible implementation of this embodiment, before sending the second packet to the second network device through the first interface, the first network device enables a capability of carrying the processing identification information and the detection header in a packet sent through the first interface. In this way, when sending the second packet to the second network device through the first interface, the first network device may carry the processing identification information and the detection header in the second packet. For ease of description, a capability of carrying processing identification information and a detection header in a packet sent through an interface (for example, the first interface) is referred to as a first capability. In a specific embodiment, the first network device may obtain a first enabling instruction, and enable the first capability of the first interface based on the first enabling instruction. The first enabling instruction may be an enabling instruction configured in the first network device via a command line, or an enabling instruction sent by a controller to the first network device. The first network device enables the first capability of the first interface, which helps the first network device carry the processing identification information and the detection header in the packet sent through the first interface, so that transmission performance of the first service flow between a device (for example, the first network device) in the first network domain and a device (for example, the second network device) outside the first network domain is detected.

In a possible implementation of this embodiment, after receiving the first packet, the first network device determines, based on a destination address of the first packet, that an outbound interface of the first packet is the first interface. After determining the first interface, the first network device detects whether the first interface enables the first capability. If the first interface enables the first capability, the first network device performs S502 to obtain the second packet, and performs S503 to send the second packet to the second network device through the first interface. In this embodiment, an example in which the first interface enables the first capability is used for description. In some embodiments, if the first network device determines that the first interface does not enable the first capability, the first network device may determine, in another manner, whether to carry the processing identification information and the detection header in the packet sent through the first interface, to determine whether to perform S502 and S503. This is not limited in this embodiment. Optionally, the first network device is used as the tail node device of the first tunnel. If the first network device determines that the first interface does not enable the first capability, the first network device may not perform S502 and S503. The first network device directly removes, from the first packet, the tunnel information, the detection header, and the detection indication information indicating the detection header, to obtain an original service packet, and sends the service packet to the second network device. This is not limited in this embodiment.

It can be learned from the descriptions of S501 and S502 that, the detection header in the second packet sent by the first network device to the second network device carries a flow identifier of the first service flow (which is the service flow in which the first packet is located, where the service flow in which the first packet is located is a service flow in which the second packet is located). In this embodiment, in a process of transmitting a detection packet (for example, the first packet and/or the second packet), the first network device may further determine performance information of the first service flow. The detection header in the second packet sent by the first network device to the second network device may further carry at least: the performance information that is of the first service flow and that is determined by the first network device. The performance information that is of the first service flow and that is determined by the first network device may include: a receiving timestamp at which the first network device receives the first packet (for ease of description, the receiving timestamp at which the first network device receives the first packet is referred to as a first receiving timestamp), and/or a sending timestamp at which the first network device sends the second packet to the second network device (for ease of description, the sending timestamp at which the first network device sends the second packet to the second network device is referred to as a first sending timestamp), and/or a quantity of packets that include the detection header and that are received by the first network device in a first detection period (for ease of description, the quantity of packets that include the detection header and that are received by the first network device in the first detection period is referred to as a first receiving quantity), and/or a quantity of packets that include the processing identification information and the detection header and that are sent by the first network device in the first detection period (for ease of description, the quantity of packets that include the processing identification information and the detection header and that are sent by the first network device in the first detection period is referred to as a first sending quantity). For example, the detection header in the second packet sent by the first network device to the second network device carries: a correspondence between the performance information that is of the first service flow and that is determined by the first network device and indication information of the first network device (for example, an identifier of the first network device, an address of the first network device, and the like), to indicate that corresponding performance information is determined by the first network device. The first detection period may be a detection period in which the first packet is located.

S504: The second network device receives the second packet sent by the first network device.

Corresponding to that the first network device sends the second packet to the second network device, the second network device receives the second packet sent by the first network device. Optionally, at least one interface is configured in the second network device, and the at least one interface includes a second interface. The second interface is used for communication between the second network device and the first network device (or the second interface is an interface that is on the second network device and that is used for connecting a link between the second network device and the first network device). The second network device receives, through the second interface, the second packet sent by the first network device. The second interface may be a VPN interface.

S505: The second network device detects, based on the processing identification information and the detection header, the transmission performance of the service flow in which the first packet is located.

After receiving the second packet, the second network device may identify the processing identification information and the detection header that are in the second packet. After identifying the processing identification information and the detection header, the second network device determines that the processing identification information indicates the second network device to process the detection header, and the second network device processes the detection header based on an indication of the processing identification information, to detect the transmission performance of the first service flow (to be specific, the service flow in which the first packet is located, where the service flow in which the first packet is located is the service flow in which the second packet is located) based on the detection header. The detection header carries the flow identifier of the first service flow, and the second network device detects the transmission performance of the first service flow based on the flow identifier of the first service flow. The transmission performance may be SLA performance, and transmission performance of a service flow includes a packet loss amount of the service flow, a transmission delay of a packet in the service flow, and/or the like.

As described above, the processing identification information includes the indication identifier and the detection identifier, the indication identifier indicates the second network device to process the detection identifier, and the detection identifier indicates the second network device to process the detection header. In a possible implementation of this embodiment, the second network device first identifies the indication identifier from the second packet, then identifies the detection identifier from the second packet based on the indication identifier, and processes the detection identifier. That the second network device processes the detection identifier may include: The second network device identifies the detection header based on the detection identifier. After identifying the detection header, the second network device processes the detection header. That the second network device processes the detection header is that the second network device detects, based on the detection header, the transmission performance of the service flow (namely, the first service flow) in which the first packet is located.

In a possible implementation of this embodiment, that the second network device detects the transmission performance of the first service flow based on the processing identification information and the detection header includes: The second network device processes the detection header based on the indication of the processing identification information, determines, based on an indication of the detection header, a receiving timestamp at which the second network device receives the second packet (for ease of description, the receiving timestamp at which the second network device receives the second packet is referred to as a second receiving timestamp), and records the second receiving timestamp in a timestamp field of the detection header. In a specific example, the second network device records a correspondence between the second receiving timestamp and indication information of the second network device (for example, an identifier of the second network device and an address of the second network device) in the timestamp field of the detection header, to indicate that the second receiving timestamp is a receiving timestamp that occurs on the second network device.

In a possible implementation of this embodiment, after receiving the second packet, the second network device obtains a third packet based on the second packet, and sends the third packet to a next-hop device (for example, a fourth network device) of the first network device on the first transmission path (to be specific, the transmission path of the service flow in which the first packet is located). The third packet includes the detection header in the second packet, and the third packet may further include detection indication information indicating the detection header. That the second network device detects the transmission performance of the first service flow based on the processing identification information and the detection header further includes: The second network device processes the detection header based on the indication of the processing identification information, determines, based on the indication of the detection header, a sending timestamp at which the second network device sends the third packet to the fourth network device (for ease of description, the sending timestamp at which the second network device sends the third packet to the fourth network device is referred to as a second sending timestamp), and records the second sending timestamp in the timestamp field of the detection header. In a specific example, the second network device records a correspondence between the second sending timestamp and the indication information of the second network device in the timestamp field of the detection header, to indicate that the second sending timestamp is a sending timestamp that occurs on the second network device.

In a possible implementation of this embodiment, the second network device is the head node device of the second tunnel in the second network domain, and that the second network device obtains the third packet based on the second packet includes: The second network device processes the second packet, and determines a processed packet as the third packet, where the third packet includes the detection header in the second packet, the detection indication information indicating the detection header, and tunnel information of the second tunnel. For example, that the second network device processes the second packet includes: The second network device removes the processing identification information from the second packet, and encapsulates, into the second packet, the tunnel information of the second tunnel and the detection indication information indicating the detection header. The detection indication information in the third packet may be the same as or different from the detection indication information in the first packet. In a specific example, the first tunnel and the second tunnel are tunnels of a same type, the third packet is the same as the first packet, and the detection indication information in the third packet is the same as the detection indication information in the first packet. For example, both the first tunnel and the second tunnel are tunnels of an MPLS type, both the detection indication information in the third packet and the detection indication information in the first packet are values in an FII label field in an FII, and both a format of the third packet and a format of the first packet may be shown in FIG. 3. For another example, both the first tunnel and the second tunnel are tunnels of an SRv6 type, both the detection indication information in the third packet and the detection indication information in the first packet are values in a detection type field (for example, an IFIT field) in an FII, and both the format of the third packet and the format of the first packet may be shown in FIG. 4. In another specific example, the first tunnel and the second tunnel are tunnels of different types. For example, the first tunnel is a tunnel of an MPLS type, the second tunnel is a tunnel of an SRv6 type, the third packet is different from the first packet, the detection indication information in the third packet is different from the detection indication information in the first packet, the detection indication information in the first packet may be a value in an FII label field in an FII, and the detection indication information in the third packet may be a value in a detection type field (for example, an IFIT field) in an FIT. For example, the format of the first packet may be shown in FIG. 3, and the format of the third packet may be shown in FIG. 4. It should be noted that, in this embodiment, an example in which the second network device removes the processing identification information from the second packet is used for description. In some embodiments, the second network device may not remove the processing identification information from the second packet. This is not limited in this embodiment.

In a possible implementation of this embodiment, that the second network device detects the transmission performance of the first service flow based on the processing identification information and the detection header further includes: The second network device processes the detection header based on the indication of the processing identification information, and counts, based on the indication of the detection header, a quantity of packets that are received by the second network device in the first detection period and that include the processing identification information and the detection header (for ease of description, the quantity of packets that are received by the second network device in the first detection period and that include the processing identification information and the detection header is referred to as a second receiving quantity), and/or a quantity of packets that are sent by the second network device and that include the detection header in the first detection period (for ease of description, the quantity of packets that are sent by the second network device and that include the detection header in the first detection period is referred to as a second sending quantity). The second network device records the second receiving quantity and/or the second sending quantity in the detection header. In a specific example, the second network device records a correspondence between the second receiving quantity and/or the second sending quantity and the indication information of the second network device in the detection header, to indicate that the second receiving quantity and/or the second sending quantity are/is determined by the second network device.

In a possible implementation of this embodiment, that the second network device detects the transmission performance of the first service flow based on the processing identification information and the detection header further includes: The second network device processes the detection header based on the indication of the processing identification information. After processing the detection header (for example, after the second network device records the second receiving timestamp, and/or the second sending timestamp, and/or the second receiving quantity, and/or the second sending quantity in the detection header), the second network device determines whether a reporting condition is met. If the reporting condition is met, the second network device reports, to the controller, the performance information of the first service flow and the flow identifier of the first service flow that are recorded in the detection header, so that the controller determines the transmission performance of the first service flow based on the received performance information of the first service flow and the flow identifier of the first service flow. The performance information of the first service flow recorded in the detection header may include at least: the performance information (for example, including the first receiving time stamp, and/or the first sending time stamp, and/or the first receiving quantity, and/or the first sending quantity) that is of the first service flow and that is determined by the first network device and the performance information (for example, including the second receiving time stamp, and/or the second sending time stamp, and/or the second receiving quantity, and/or the second sending quantity) that is of the first service flow and that is determined by the second network device. The controller may determine at least the following based on the received performance information of the first service flow and the flow identifier of the first service flow: a quantity of lost packets of the first service flow on the first network device, and/or a quantity of lost packets of the first service flow on the second network device, and/or a quantity of lost packets of the first service flow on the link between the first network device and the second network device, and a transmission delay of a detection packet (for example, the first packet, the second packet, or the third packet) on the first network device, and/or a transmission delay of a detection packet on the second network device, and/or a transmission delay of a detection packet on the link between the first network device and the second network device.

Optionally, that the second network device determines whether the reporting condition is met includes: The second network device determines, based on a detection period recorded in a detection header of a detection packet (for example, the second packet or the third packet), whether a reporting moment arrives. If the reporting moment arrives, the second network device determines that the reporting condition is met; otherwise, the second network device determines that the reporting condition is not met. That the second network device reports the performance information of the first service flow and the flow identifier of the first service flow to the controller may include: The second network device reports the performance information of the first service flow and the flow identifier of the first service flow to an intra-domain controller (for example, a controller 200 in VPN2 shown in FIG. 1) in the second network domain, and the intra-domain controller in the second network domain reports the performance information of the first service flow and the flow identifier of the first service flow to an E2E controller (for example, a controller 300 shown in FIG. 1). This is not limited in this embodiment.

In this embodiment, before the second network device identifies the processing identification information and the detection header that are in the second packet (for example, before the second network device performs S505), the second network device may enable a capability of identifying processing identification information and a detection header that are carried in a packet received through the second interface of the second network device. In this way, after receiving the second packet through the second interface, the second network device may identify the processing identification information and the detection header that are in the second packet, to perform S505. For ease of description, a capability of identifying processing identification information and a detection header that are carried in a packet received through an interface (for example, the second interface) is referred to as a second capability. In a specific embodiment, the second network device may obtain a second enabling instruction, and enable the second capability of the second interface based on the second enabling instruction. The second enabling instruction may be an enabling instruction configured in the second network device via a command line, or an enabling instruction sent by the controller to the second network device. This is not limited in this embodiment. The second network device enables the second capability of the second interface, which helps the second network device inherit the detection header in the second packet to detect the transmission performance of the first service flow, so that the transmission performance of the first service flow between the device (for example, the first network device) in the first network domain and the device (for example, the second network device) outside the first network domain is detected.

In a possible implementation of this embodiment, after receiving the second packet through the second interface, the second network device detects whether the second interface enables the second capability. If the second interface enables the second capability, the second network device performs S505. In this embodiment, an example in which the second interface enables the second capability is used for description. In some embodiments, if the second network device determines that the second interface does not enable the second capability, the second network device may determine, in another manner, whether to identify the processing identification information and the detection header that are carried in the packet received through the second interface, to determine whether to perform S505. This is not limited in this embodiment. Optionally, the detection header in the second packet (which is also the detection header in the first packet) is a first detection header, the flow identifier of the first service flow in the first detection header is a first flow identifier, and the second network device serves as the tail node device of the second tunnel. If the second network device determines that the second interface does not enable the second capability, the second network device does not identify the processing identification information and the detection header that are in the second packet, and the second network device detects whether information (for example, a 5-tuple, a 3-tuple, or the like) about the second packet matches the information (for example, a 5-tuple, a 3-tuple, or the like) about the to-be-detected service flow. If the information about the second packet matches the information about the to-be-detected service flow, the second network device generates a flow identifier (for example, a second flow identifier, where the second flow identifier is usually different from the first flow identifier) for the first service flow, inserts a second detection header into the second packet, records the second flow identifier in the second detection header to obtain a fourth packet, and sends the fourth packet to a device located after the second network device on the first transmission path, so that each device on the second tunnel detects the transmission performance of the first service flow based on the second detection header.

In this embodiment, an example in which the first interface of the first network device enables a first function and the second interface of the second network device enables a second function is used for description. In some embodiments, both the first interface of the first network device and the second interface of the second network device may enable the first function and the second function, so that the first network device can carry the processing identification information and the detection header in the packet sent through the first interface, and can identify the processing identification information and the detection header that are carried in the packet received through the first interface, and the second network device can carry the processing identification information and the detection header in the packet sent through the second interface, and can identify the processing identification information and the detection header that are carried in the packet received through the second interface. Therefore, bidirectional detection of transmission performance of a service flow transmitted between the first network device and the second network device is implemented.

In the foregoing descriptions of this embodiment, an example in which the second network device detects the transmission performance of the first service flow based on the processing identification information and the detection header that are in the second packet is used for description. In some embodiments, each network device on the first transmission path may detect the transmission performance of the first service flow based on the detection header in a received detection packet, and each network device on the first transmission path may report, to the controller, performance information that is of the first service flow and that is determined by the network device. Alternatively, a specified network device on the first transmission path (for example, a source end device or a destination end device on the first transmission path, a head node device or a tail node device of the first tunnel, a head node device or a tail node device of the second tunnel, or any other network device) reports the performance information of the first service flow to the controller. This is not limited in this embodiment.

In conclusion, according to the detection packet transmission method provided in this embodiment, the first network device is the edge network device in the first network domain, the second network device is the next-hop device of the first network device on the transmission path of the service flow in which the first packet is located, and the second network device does not belong to the first network domain. After receiving the first packet including the detection header, the first network device obtains, based on the first packet, the second packet including the processing identification information and the detection header, and sends the second packet to the second network device, where the detection header indicates the network device to detect, based on the detection header, the transmission performance of the service flow in which the first packet is located, and the processing identification information indicates the second network device to process the detection header. After receiving the second packet, the second network device processes the detection header in the second packet based on the processing identification information in the second packet, to detect, based on the detection header, the transmission performance of the service flow in which the first packet is located. In this way, the transmission performance of the service flow between the first network device in the first network domain and the second network device outside the first network domain is detected. This helps improve flexibility of detection of the transmission performance of the service flow, and scenarios are wide.

According to the detection packet transmission method provided in this embodiment, the second network device that does not belong to the first network domain detects, by inheriting a detection header in a detection packet (for example, the first packet) transmitted in the first network domain, the transmission performance of the service flow in which the first packet is located. This helps implement unified detection of transmission performance of a service flow transmitted in an end-to-end manner. For example, the second network device belongs to the second network domain, so that a network device in the first network domain and a network device in the second network domain detect transmission performance of a same service flow based on a same detection header, to implement detection of a service flow transmitted in an end-to-end manner across network domains (for example, VPNs).

For ease of understanding the technical solutions, the following compares a current IFIT technology with the technical solutions of embodiments with reference to the accompanying drawings.

Figure 8:
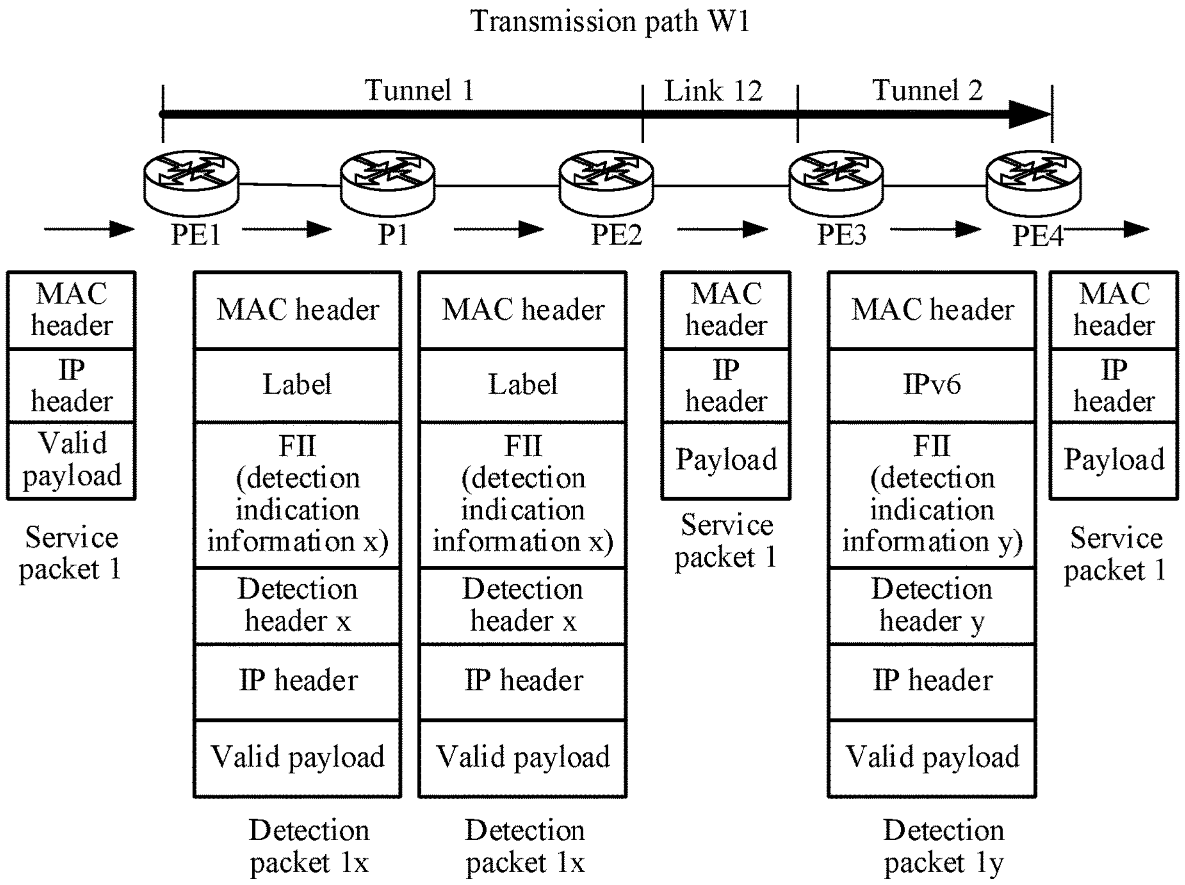
FIG. 8 is a schematic diagram of a detection packet transmission method according to an embodiment.
Figure 9:
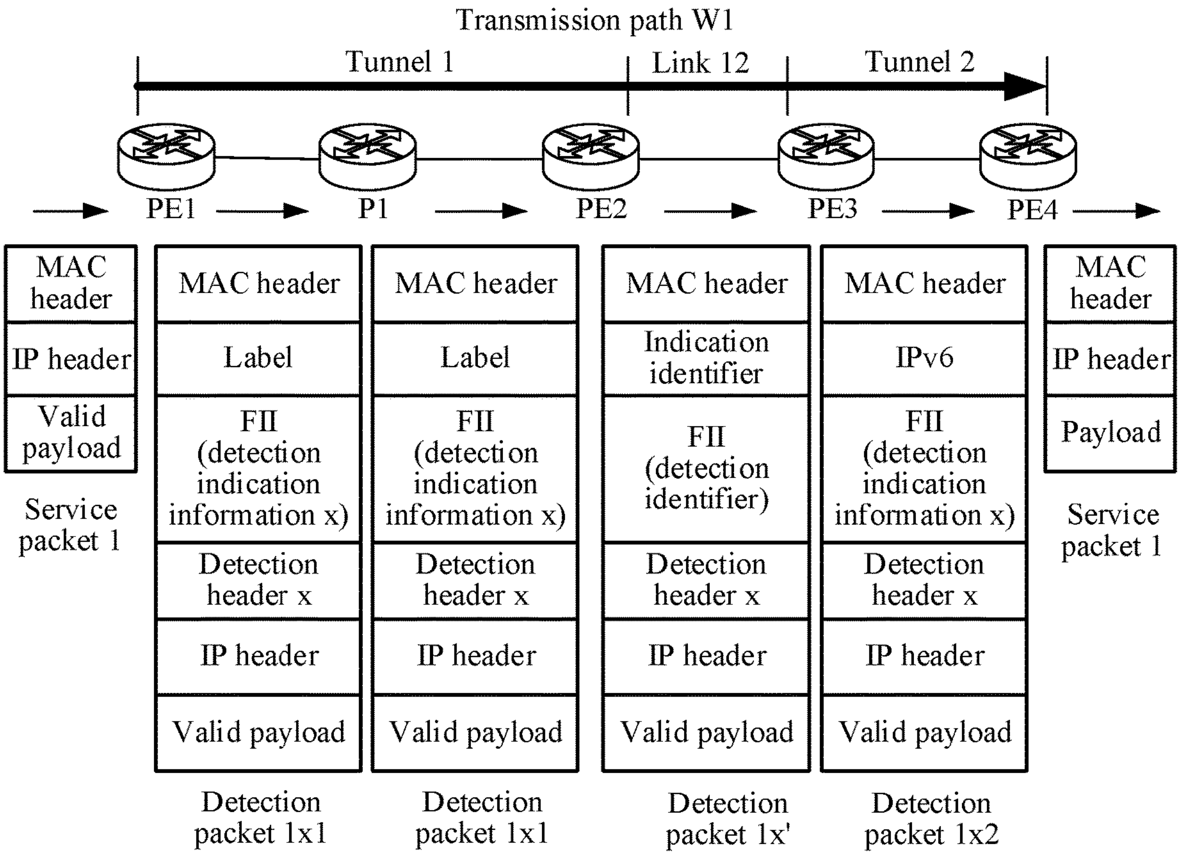
FIG. 9 is a schematic diagram of another detection packet transmission method according to an embodiment.

For example, refer to FIG. 8 and FIG. 9. FIG. 8 is a schematic diagram of a packet transmission method in the current IFIT technology, and FIG. 9 is a schematic diagram of a packet transmission method according to an embodiment. In FIG. 8 and FIG. 9, an example in which a packet is transmitted from PE1 to PE4 in an end-to-end manner is used for description. A detection packet may be an IFIT packet, and a detection header may be an IFIT header. Alternatively, in some embodiments, an FII and a detection header jointly form an IFIT header. As shown in FIG. 8 and FIG. 9, a transmission path W1 of a service flow (for example, a service flow 1) in which a service packet 1 is located includes a tunnel 1 located in VPN1 (not shown in FIG. 8 and FIG. 9), a tunnel 2 located in VPN2 (not shown in FIG. 8 and FIG. 9), and a link 12 located between VPN1 and VPN2. PE1 is a head node device of the tunnel 1, PE2 is a tail node device of the tunnel 1, PE3 is a head node device of the tunnel 2, PE4 is a tail node device of the tunnel 2, the link 12 is a link between PE2 and PE3, an interface 1 of PE2 is connected to the link 12, and an interface 2 of PE3 is connected to the link 12. In FIG. 8 and FIG. 9, an example in which the packet is forwarded based on an MPLS label in the tunnel 1 and forwarded based on an IPv6 in the tunnel 2 is used for description.

Refer to FIG. 8. In the current IFIT technology, after receiving the service packet 1, PE1 determines that information about the service packet 1 matches information about a to-be-detected service flow. PE1 generates a flow ID (for example, flow ID x) for the service flow 1 in which the service packet 1 is located, inserts a detection header x and an FII into the service packet 1, records the flow ID x in the detection header x, and records, in the FII, detection indication information x indicating the detection header x, to obtain a detection packet 1$x$ (where PE1 further encapsulates tunnel information, for example, a label shown in FIG. 8, of the tunnel 1 into the service packet 1, and details are not described herein again). Then, PE1 forwards the detection packet 1$x$ to a next-hop device P1 of PE1 on the transmission path W1. The P1 is a transit node device of the tunnel 1, and P1 forwards the detection packet 1$x$ to a next-hop device PE2 of P1 on the transmission path W1 PE2 is used as a tail node device of the tunnel 1. After receiving the detection packet 1$x$, PE2 removes the detection header x and the detection indication information x (for example, the detection header x and the FII) indicating the detection header x from the detection packet 1$x$ to obtain the service packet 1 (where PE2 further removes the tunnel information from the detection packet 1$x$, and details are not described herein). PE2 forwards the service packet 1 to a next-hop device PE3 of PE2 on the transmission path W1 through the interface 1 of PE2. PE3 is used as the head node device of the tunnel 2. After receiving the service packet 1 through the interface 2 of PE2, PE3 determines that the information about the service packet 1 matches the information about the to-be-detected service flow. PE3 generates a flow ID (for example, flow ID y) for the service flow 1 in which the service packet 1 is located, inserts a detection header y and an FII into the service packet 1, records the flow ID y in the detection header y, and records, in the FII, detection indication information y indicating the detection header y, to obtain a detection packet 1$y$ (where PE3 further encapsulates tunnel information, for example, an IPv6 shown in FIG. 8, of the tunnel 2 into the service packet 1, and details are not described herein again). Then, PE3 forwards the detection packet 1$y$ to a next-hop device PE4 of PE3 on the transmission path W1 PE4 is used as the tail node device of the tunnel 2. After receiving the detection packet 1$y$, PE4 removes, from the detection packet 1$y$, the detection header y and the detection indication information y (for example, the detection header y and the FII) indicating the detection header y, to obtain the service packet 1 (where PE4 further removes the tunnel information from the detection packet 1$y$, and details are not described herein again), and forwards the service packet 1. In the foregoing process, PE1, P1, and PE2 detect, based on the detection header x, transmission performance of the service flow 1 in which the service packet 1 is located and that is in the tunnel 1, and PE3 and PE4 detect, based on the detection header y, transmission performance of the service flow 1 in which the service packet 1 is located and that is in the tunnel 2. However, transmission performance of the service flow 1 in the link 12 cannot be detected. In addition, because the flow ID x of the service flow 1 recorded in the detection header x is different from the flow ID y of the service flow 1 recorded in the detection header y, a controller determines that transmission performance of the service flow 1 detected by PE1, P1, and PE2 and transmission performance of the service flow 1 detected by PE3 and PE4 are transmission performance of two different service flows. Therefore, unified detection of transmission performance of the service flow 1 transmitted from PE1 to PE4 in an end-to-end manner cannot be implemented.

Refer to FIG. 9. In this embodiment, PE2 enables a capability of carrying processing identification information and a detection header in a packet sent through the interface 1 of PE2, and PE3 enables a capability of identifying processing identification information and a detection header that are carried in a packet received through the interface 2 of PE3. In FIG. 9, an example in which the processing identification information includes an indication identifier and a detection identifier is used for description. After receiving the service packet 1, PE1 determines that the information about the service packet 1 matches the information about the to-be-detected service flow. PE1 generates the flow ID (for example, flow ID x) for the service flow 1 in which the service packet 1 is located, inserts the detection header x and the FII into the service packet 1, records the flow ID x in the detection header x, and records, in the FII, the detection indication information x indicating the detection header x, to obtain a detection packet 1$x$1 (where PE1 further encapsulates the tunnel information, for example, the label shown in FIG. 9, of the tunnel 1 into the service packet 1, details are not described herein again, and the detection packet 1$x$1 is, for example, the first packet in the foregoing embodiments). Then, PE1 forwards the detection packet 1$x$1 to the next-hop device P1 of PE1 on the transmission path W1. The P1 is the transit node device of the tunnel 1. Therefore, P1 forwards the detection packet 1$x$1 to the next-hop device PE2 of P1 on the transmission path W1. As the tail node device of the tunnel 1, PE2 pre-enables the capability of carrying the processing identification information and the detection header in the packet sent through the interface 1 of PE2. Therefore, after receiving the detection packet 1$x$1, PE2 inserts the processing identification information into the detection packet 1$x$1, to obtain a detection packet 1$x'$ (where PE2 further removes the tunnel information from the detection packet 1$x$1, details are not described herein again, and the detection packet 1$x'$ is, for example, the second packet in the foregoing embodiments). For example, PE2 deletes the detection indication information x from the FII in the detection packet 1$x$1, and records the detection identifier in the FII in the detection packet 1$x$1. In addition, PE1 inserts the indication identifier into the detection packet 1$x$1 to obtain the detection packet 1$x'$. After obtaining the detection packet 1$x'$, PE2 forwards the detection packet 1$x'$ to the next-hop device PE3 of PE2 on the transmission path W1. As the head node device of the tunnel 2, PE3 pre-enables the capability of identifying the processing identification information and the detection header that are carried in the packet received through the interface 2 of PE3. After receiving the detection packet 1$x'$ through the interface 2 of PE3, PE3 processes the detection header x in the detection packet 1$x'$ based on the processing identification information in the detection packet 1$x'$, removes the processing identification information from the detection packet 1$x'$, and records, in the FII of the detection packet 1$x'$, the detection indication information x indicating the detection header x, to obtain a detection packet 1$x$2 (where PE3 further encapsulates the tunnel information, for example, the IPv6 shown in FIG. 9, of the tunnel 2 into the detection packet 1$x'$, details are not described herein again, and the detection packet 1$x$2 is, for example, the third packet in the foregoing embodiments). The detection packet 1$x$2 includes the detection header x in the detection packet 1$x'$ and the detection indication information x indicating the detection header x. Then, PE3 forwards the detection packet 1$x$2 to the next-hop device PE4 of PE3 on the transmission path W1. PE4 is used as the tail node device of the tunnel 2. After receiving the detection packet 1$x$2, PE4 removes, from the detection packet 1$x$2, the detection header x and the detection indication information x (for example, the detection header x and the FII) indicating the detection header x, to obtain the service packet 1 (where PE4 further removes the tunnel information from the detection packet 1$x$2, and details are not described herein), and forwards the service packet 1. In the foregoing process, PE1, P1, and PE2 detect the transmission performance of the service flow 1 in the tunnel 1 based on the detection header x in the detection packet 1$x$1, PE2 and PE3 detect the transmission performance of the service flow 1 in the link 12 based on the detection header x in the detection packet 1$x'$, and PE3 and PE4 detect the transmission performance of the service flow 1 in the tunnel 2 based on the detection header x in the detection packet 1$x$2. In this way, the transmission performance of the service flow 1 in the link 12 can be detected. PE1, P1, PE2, PE3, and PE4 detect transmission performance of the service flow 1 based on the same detection header x. Therefore, the unified detection of the transmission performance of the service flow 1 that is transmitted from PE1 to PE4 in an end-to-end manner can be implemented. Compared with the technical solution shown in FIG. 8, the technical solution shown in FIG. 9 is only applicable to detection of transmission performance of a service flow transmitted in an end-to-end manner in a VPN, and is further applicable to detection of transmission performance of a service flow transmitted in an end-to-end manner across VPNs. Therefore, the technical solution shown in FIG. 9 has a wide scenario and high flexibility.

The foregoing describes the detection packet transmission method provided in embodiments. The following describes apparatus embodiments. The apparatuses may be configured to perform the detection packet transmission method. For details not disclosed in apparatus embodiments, refer to the method embodiments.

Figure 10:
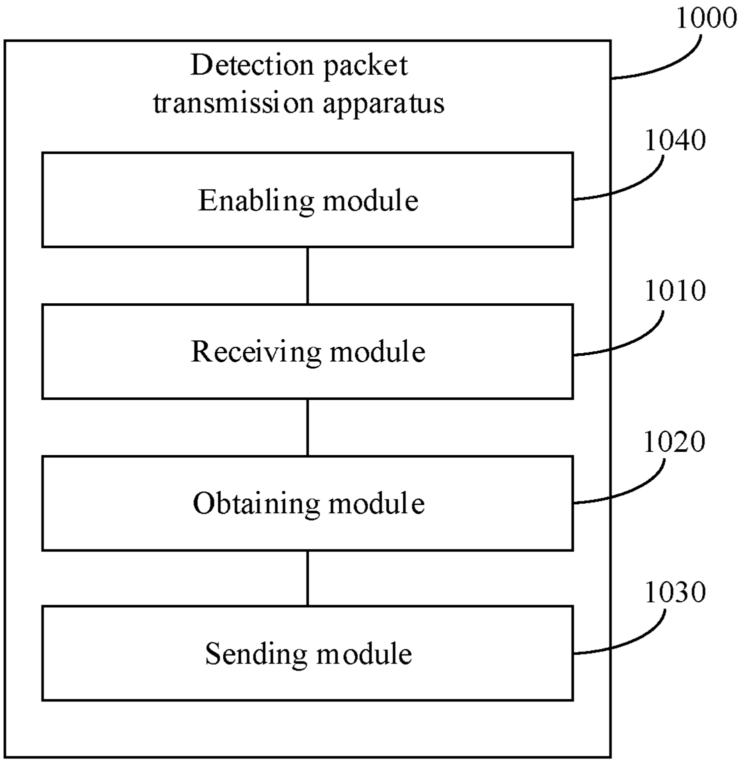
FIG. 10 is a schematic diagram of a structure of a detection packet transmission apparatus according to an embodiment.

FIG. 10 is a schematic diagram of a structure of a detection packet transmission apparatus 1000 according to an embodiment. The transmission apparatus 1000 is used in a first network device. For example, the transmission apparatus 1000 is a first network device or a functional component in the first network device. Refer to FIG. 10. The transmission apparatus 1000 may include but is not limited to: a receiving module 1010 configured to receive a first packet, where the first packet includes a detection header indicating a network device to detect, based on the detection header, transmission performance of a service flow in which the first packet is located, and the first network device is an edge network device in a first network domain, and for implementation of a function of the receiving module 1010, reference may be made to related descriptions in S501; an obtaining module 1020 configured to obtain a second packet based on the first packet, where the second packet includes processing identification information and the detection header, the processing identification information indicates a second network device to process the detection header, the second network device is a next-hop device of the first network device on a transmission path of the service flow, and the second network device does not belong to the first network domain, and for implementation of a function of the obtaining module 1020, reference may be made to related descriptions in S502; and a sending module 1030 configured to send the second packet to the second network device, where for implementation of a function of the sending module 1030, reference may be made to related descriptions in S503.

Optionally, the second packet further includes a MAC header and an IP header, and the processing identification information and the detection header are located between the MAC header and the IP header.

Optionally, the processing identification information and the detection header are distributed, between the MAC header and the IP header, towards the MAC header and away from the MAC header, and the processing identification information and the detection header are adjacent to each other.

Optionally, the processing identification information includes an indication identifier and a detection identifier, the indication identifier indicates the second network device to process the detection identifier, and the detection identifier indicates the second network device to process the detection header.

Optionally, the indication identifier and the detection identifier are distributed, between the MAC header and the detection header, towards the MAC header and away from the MAC header, and the indication identifier and the detection identifier are adjacent to each other.

Optionally, the detection header is an IFIT header.

Optionally, the second network device is an edge network device in a second network domain.

Optionally, the first network device is a tail node device of a first tunnel that belongs to the first network domain, the second network device is a head node device of a second tunnel that belongs to the second network domain, and the first tunnel and the second tunnel each are a segment of a tunnel on the transmission path.

Optionally, at least one of the first network domain and the second network domain is a VPN.

Optionally, still refer to FIG. 10. The transmission apparatus 1000 further includes: an enabling module 1040 configured to enable a capability of carrying the processing identification information and the detection header in a packet that is sent through a first interface of the first network device, where the sending module 1030 is configured to send the second packet to the second network device through the first interface of the first network device.

In conclusion, according to the detection packet transmission apparatus provided in this embodiment, the first network device is the edge network device in the first network domain, the second network device is the next-hop device of the first network device on the transmission path of the service flow in which the first packet is located, and the second network device does not belong to the first network domain. After receiving the first packet including the detection header, the first network device obtains, based on the first packet, the second packet including the processing identification information and the detection header, and sends the second packet to the second network device, where the detection header indicates the network device to detect, based on the detection header, the transmission performance of the service flow in which the first packet is located, and the processing identification information indicates the second network device to process the detection header. After receiving the second packet, the second network device processes the detection header in the second packet based on the processing identification information in the second packet, to detect, based on the detection header, the transmission performance of the service flow in which the first packet is located. In this way, the transmission performance of the service flow between the first network device in the first network domain and the second network device outside the first network domain is detected. This helps improve flexibility of detection of the transmission performance of the service flow, and scenarios are wide.

Figure 11:
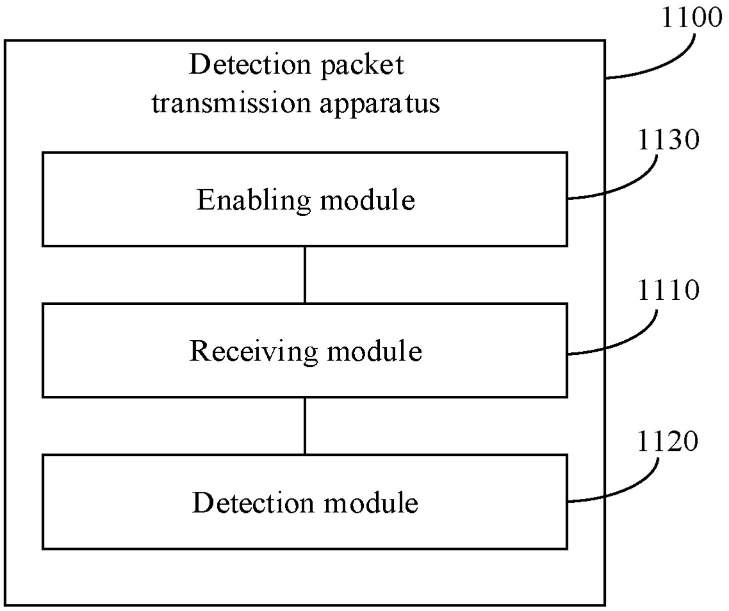
FIG. 11 is a schematic diagram of a structure of another detection packet transmission apparatus according to an embodiment.

FIG. 11 is a schematic diagram of a structure of another detection packet transmission apparatus 1100 according to an embodiment. The transmission apparatus 1100 is used in a second network device. For example, the transmission apparatus 1100 is the second network device or a functional component in the second network device. Refer to FIG. 11. The transmission apparatus 1100 may include but is not limited to: a receiving module 1110 configured to receive a second packet sent by a first network device, where the second packet is obtained by the first network device based on a first packet, the first packet includes a detection header indicating a network device to detect, based on the detection header, transmission performance of a service flow in which the first packet is located, the second packet includes processing identification information and the detection header, the processing identification information indicates the second network device to process the detection header, the first network device is an edge network device in a first network domain, the second network device is a next-hop device of the first network device on a transmission path of the service flow, and the second network device does not belong to the first network domain, and for implementation of a function of the receiving module 1110, reference may be made to related descriptions in S504; and a detection module 1120 configured to detect, based on the processing identification information and the detection header that are in the second packet, the transmission performance of the service flow in which the first packet is located, where for implementation of a function of the detection module 1120, reference may be made to related descriptions in S505.

Optionally, the second packet further includes a MAC header and an IP header, and the processing identification information and the detection header are located between the MAC header and the IP header.

Optionally, the processing identification information and the detection header are distributed, between the MAC header and the IP header, towards the MAC header and away from the MAC header, and the processing identification information and the detection header are adjacent to each other.

Optionally, the processing identification information includes an indication identifier and a detection identifier, the indication identifier indicates the second network device to process the detection identifier, and the detection identifier indicates the second network device to process the detection header.

Optionally, the indication identifier and the detection identifier are distributed, between the MAC header and the detection header, towards the MAC header and away from the MAC header, and the indication identifier and the detection identifier are adjacent to each other.

Optionally, the detection header is an IFIT header.

Optionally, the second network device is an edge network device in a second network domain.

Optionally, the first network device is a tail node device of a first tunnel that belongs to the first network domain, the second network device is a head node device of a second tunnel that belongs to the second network domain, and the first tunnel and the second tunnel each are a segment of a tunnel on the transmission path.

Optionally, at least one of the first network domain and the second network domain is a VPN.

Optionally, still refer to FIG. 11. The transmission apparatus 1100 further includes: an enabling module 1130 configured to enable a capability of identifying the processing identification information and the detection header that are carried in a packet received through a second interface of the second network device, where the receiving module 1110 is configured to receive, through the second interface of the second network device, the second packet sent by the first network device.

In conclusion, according to the detection packet transmission apparatus provided in this embodiment, the first network device is the edge network device in the first network domain, the second network device is the next-hop device of the first network device on the transmission path of the service flow in which the first packet is located, the second network device does not belong to the first network domain, the second packet sent by the first network device to the second network device is obtained by the first network device based on the first packet, the first packet includes the detection header, and the detection header indicates the network device to detect, the transmission performance of the service flow in which the first packet is located, the second packet includes the processing identification information and the detection header, and the processing identification information indicates the second network device to process the detection header. After receiving the second packet, the second network device processes the detection header in the second packet based on the processing identification information in the second packet, to detect, based on the detection header, the transmission performance of the service flow in which the first packet is located. In this way, the transmission performance of the service flow between the first network device in the first network domain and the second network device outside the first network domain is detected. This helps improve flexibility of detection of the transmission performance of the service flow, and scenarios are wide.

It should be understood that the detection packet transmission apparatus in this embodiment may alternatively be implemented by using an application-specific integrated circuit (ASIC) or a programmable logic device (PLD). The PLD may be a complex PLD (CPLD), a field-programmable gate array (FPGA), a generic array logic (GAL), or any combination thereof. Alternatively, the detection packet transmission method provided in the foregoing method embodiments may be implemented by using software. When the detection packet transmission method provided in the foregoing method embodiments is implemented by using software, modules in the detection packet transmission apparatus may be software modules.

Figure 12:
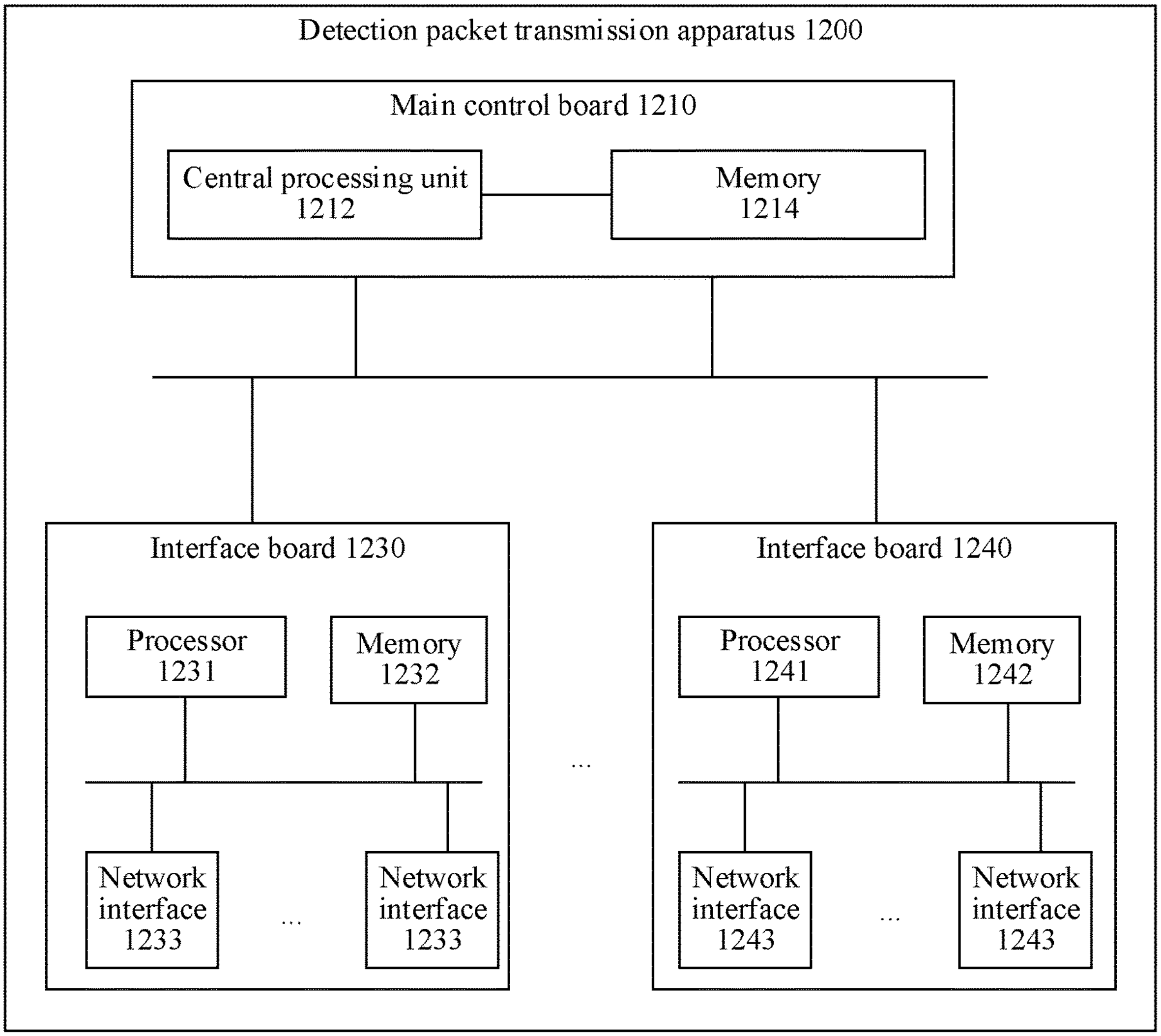
FIG. 12 is a schematic diagram of a structure of still another detection packet transmission apparatus according to an embodiment.

FIG. 12 is a schematic diagram of a structure of still another detection packet transmission apparatus 1200 according to an embodiment. The detection packet transmission apparatus 1200 may be the first network device or the second network device in the foregoing embodiments, or a functional component in the first network device or the second network device. As shown in FIG. 12, the detection packet transmission apparatus 1200 includes: a main control board 1210, an interface board 1230, and an interface board 1240. When there are a plurality of interface boards, a switching board (not shown in the FIG. 12) may be included. The switching board is configured to complete data exchange between the interface boards (where the interface board is also referred to as a line card or a service board).

The main control board 1210 is configured to complete system management, device maintenance, protocol processing, and other functions. The interface board 1230 and the interface board 1240 are configured to provide various service interfaces (for example, a Packet over SONET/SDH (POS) interface, a gigabit Ethernet (GE), an Asynchronous Transfer Mode (ATM) interface, and the like), and implement packet forwarding. The main control board 1210 mainly includes three types of functional units: a system management and control unit, a system clock unit, and a system maintenance unit. The main control board 1210, the interface board 1230, and the interface board 1240 are connected to a system backplane through a system bus to implement interworking. The interface board 1230 includes one or more processors 1231. The processor 1231 is configured to control and manage the interface board 1230, and communicate with a central processing unit 1212 on the main control board 1210. A memory 1232 on the interface board 1230 is configured to store a routing and forwarding table and the like. The processor 1231 forwards a packet based on the routing and forwarding table, and detects, based on a detection header carried in the packet, transmission performance of a service flow in which the packet is located. As shown in FIG. 12, the main control board 1210 may include a memory 1214. The memory 1214 on the main control board 1210 may also be configured to store a routing and forwarding table and the like. This is not limited in this embodiment.

The interface board 1230 includes one or more network interfaces 1233 that are configured to receive and send a packet. The processor 1231 detects, based on a detection header carried in the packet received by the network interface 1233, transmission performance of a service flow in which the packet is located. A specific implementation process is not described herein again. Specific functions of the processor 1231 are not described herein again.

It may be understood that, as shown in FIG. 12, this embodiment includes a plurality of interface boards, and uses a distributed forwarding mechanism. In this mechanism, operations on the interface board 1240 are basically similar to operations on the interface board 1230. For brevity, details are not described again. In addition, it may be understood that the processor 1231 on the interface board 1230 and/or a processor 1241 on the interface board 1240 in FIG. 12 may be dedicated hardware or a chip, for example, a network processor or an application-specific integrated circuit, to implement the foregoing functions. This implementation is generally referred to as a manner of using dedicated hardware or a chip for processing on a forwarding plane. In another implementation, the processor 1231 on the interface board 1230 and/or the processor 1241 on the interface board 1240 may alternatively use a general-purpose processor, for example, a general-purpose central processing unit (CPU), to implement the functions described above.

In addition, it should be noted that there may be one or more main control boards, and when there are a plurality of main control boards, the main control boards may include an active main control board and a standby main control board. There may be one or more interface boards. A network device having a stronger data processing capability provides more interface boards. If there are a plurality of interface boards, the plurality of interface boards can communicate with each other via one or more switching boards, and the plurality of interface boards can jointly implement load balancing and redundancy backup. In a centralized forwarding architecture, the network device may not need the switching board, and the interface board provides a function of processing service data of an entire system. In a distributed forwarding architecture, the network device includes a plurality of interface boards. Data exchange between the plurality of interface boards may be implemented by using a switching board, and the plurality of interface boards can provide a large-capacity data exchange and processing capability. Therefore, a data access and processing capability of a network device in the distributed architecture is better than that of a device in the centralized architecture. A specific architecture that is to be used depends on a specific networking deployment scenario. This is not limited herein.

In a specific embodiment, the memory 1232 may be a read-only memory (ROM) or another type of static storage device that can store static information and instructions, or a random-access memory (RAM) or another type of dynamic storage device that can store information and instructions. The memory 1232 may alternatively be an electrically erasable programmable ROM (EEPROM), a compact disc ROM (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be used for carrying or storing expected program code in a form of instructions or a data structure and that can be accessed by a computer. However, the memory 1232 is not limited thereto. The memory 1232 may exist independently, and is connected to the processor 1231 via a communication bus. The memory 1232 may alternatively be integrated with the processor 1231.

The memory 1232 is configured to store program code, and the processor 1231 controls execution of the program code, to perform some or all of the steps of the detection packet transmission method provided in the foregoing embodiments. The processor 1231 is configured to execute the program code stored in the memory 1232. The program code may include one or more software modules. The one or more software modules may be the functional modules provided in the embodiment shown in FIG. 8 or FIG. 9. The memory 1214 may also be configured to store program code, and the central processing unit 1212 controls execution of the program code, to perform some or all of the steps of the detection packet transmission method provided in the foregoing embodiments.

In a specific embodiment, the network interface 1233 may use any transceiver-type apparatus, and is configured to communicate with another device or a communication network such as the Ethernet, a radio access network (RAN), or a wireless local area network (WLAN).

Figure 13:
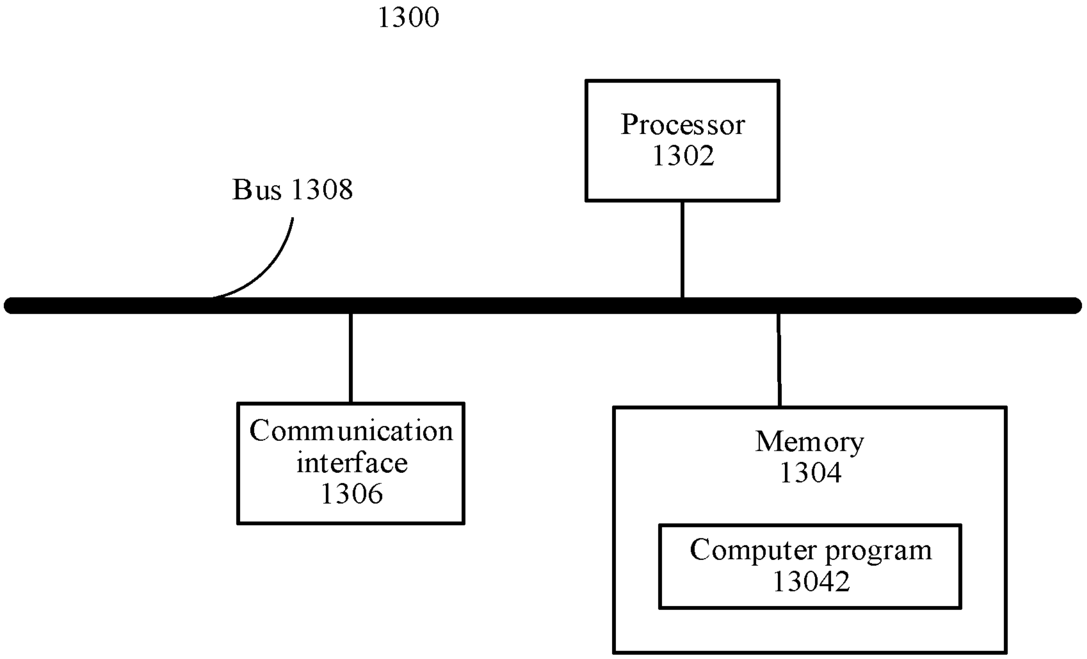
FIG. 13 is a schematic diagram of a structure of still yet another detection packet transmission apparatus according to an embodiment.

FIG. 13 is a schematic diagram of a structure of still yet another detection packet transmission apparatus 1300 according to an embodiment. The detection packet transmission apparatus 1300 may be the first network device or the second network device in any one of the foregoing embodiments, or a functional component in the first network device or the second network device. Refer to FIG. 13. The detection packet transmission apparatus 1300 includes a processor 1302, a memory 1304, a communication interface 1306, and a bus 1308. The processor 1302, the memory 1304, and the communication interface 1306 are communicatively connected to each other via the bus 1308. A connection manner between the processor 1302, the memory 1304, and the communication interface 1306 shown in FIG. 13 is merely an example. In an implementation process, the processor 1302, the memory 1304, and the communication interface 1306 may alternatively be communicatively connected to each other in another connection manner other than using the bus 1308.

The memory 1304 may be configured to store a computer program 13042. The computer program 13042 may include instructions and data. In this embodiment, the memory 1304 may be various types of storage media, for example, a RAM, a ROM, a non-volatile RAM (NVRAM), a programmable ROM (PROM), an erasable PROM (EPROM), an electrically erasable PROM (EEPROM), a flash memory, an optical memory, a register, and the like. In addition, the memory 1304 may include a hard disk and/or an internal storage.

The processor 1302 may be a general-purpose processor. The general-purpose processor may be a processor that reads and executes a computer program (for example, the computer program 13042) stored in a memory (for example, the memory 1304) to perform a specific step and/or operation. In a process of performing the foregoing steps and/or operations, the general-purpose processor may use data stored in the memory (for example, the memory 1304). For example, the stored computer program may be executed to implement related functions of the obtaining module 1020, the enabling module 1040, the detection module 1120, and the enabling module 1130. The general-purpose processor may be, for example, but not limited to, a CPU. In addition, the processor 1302 may alternatively be a dedicated processor. The dedicated processor may be a processor specially designed to perform a specific step and/or operation. The dedicated processor may be, for example, but not limited to, a digital signal processor (DSP), an ASIC, an FPGA, or the like. In addition, the processor 1302 may alternatively be a combination of a plurality of processors, for example, a multi-core processor. The processor 1302 may include at least one circuit, to perform all or some of the steps of the detection packet transmission method provided in the foregoing embodiments.

The communication interface 1306 may include interfaces configured to implement interconnection between components, such as an input/output (I/O) interface, a physical interface, and a logical interface, inside the detection packet transmission apparatus 1300, an interface configured to implement interconnection between the detection packet transmission apparatus 1300 and another device (for example, a network device), and the like. The physical interface may be a GE interface, and may be configured to implement interconnection between the detection packet transmission apparatus 1300 and another device. The logical interface is an internal interface of the detection packet transmission apparatus 1300, and may be configured to implement interconnection between components inside the detection packet transmission apparatus 1300. It is easy to understand that the communication interface 1306 may be used by the detection packet transmission apparatus 1300 to communication with another device. For example, the communication interface 1306 is configured to send and receive a packet between the detection packet transmission apparatus 1300 and another device. The communication interface 1306 may implement related functions of the receiving module 1010, the sending module 1030, and the receiving module 1110. In addition, the communication interface 1306 may further include a transceiver to send and receive a packet. The transceiver may also implement the related functions of the receiving module 1010, the sending module 1030, and the receiving module 1110.

The bus 1308 may be any type of communication bus, for example, a system bus configured to implement interconnection between the processor 1302, the memory 1304, and the communication interface 1306.

The foregoing components may be separately disposed on chips that are independent of each other, or at least some or all of the components may be disposed on a same chip. Whether the components are separately disposed on different chips or integrated and disposed on one or more chips usually depends on a requirement of a product design. This embodiment imposes no limitation on specific implementations of the foregoing components.

The detection packet transmission apparatus 1300 shown in FIG. 13 is merely an example. In an implementation process, the detection packet transmission apparatus 1300 may further include other components, which are not enumerated one by one in this specification. The detection packet transmission apparatus 1300 shown in FIG. 13 transmits a detection packet between a device in a network domain (for example, a VPN) and a device outside the network domain (for example, a VPN) by performing all or some steps of the detection packet transmission method provided in the foregoing embodiments, to detect transmission performance of a service flow between the device in the network domain (for example, the VPN) and the device outside the network domain (for example, the VPN). For example, transmission performance of a service flow transmitted across network domains (for example, VPNs) is detected.

An embodiment provides a detection packet transmission system, including: a first network device and a second network device, where the first network device includes the detection packet transmission apparatus 1000 shown in FIG. 10, and the second network device includes the detection packet transmission apparatus 1100 shown in FIG. 11. Alternatively, at least one of the first network device and the second network device is the detection packet transmission apparatus shown in FIG. 12 or FIG. 13.

Optionally, the first network device is an edge network device in a first network domain, the second network device is a next-hop device of the first network device on a transmission path of a service flow in which a first packet is located, and the second network device does not belong to the first network domain.

Optionally, the second network device is an edge network device in a second network domain.

Optionally, the first network device is a tail node device of a first tunnel that belongs to the first network domain, the second network device is a head node device of a second tunnel that belongs to the second network domain, and the first tunnel and the second tunnel each are a segment of a tunnel on the transmission path of the service flow in which the first packet is located.

An embodiment provides a computer-readable storage medium. The computer-readable storage medium stores a computer program. When the computer program is executed (for example, executed by a network device, one or more processors, or the like), all or some of the steps of the detection packet transmission method provided in the foregoing method embodiments are implemented.

An embodiment provides a computer program product. The computer program product includes a program or code. When the program or the code is executed (for example, executed by a network device, one or more processors, or the like), all or some of the steps of the detection packet transmission method provided in the foregoing method embodiments are implemented.

An embodiment provides a chip. The chip includes a programmable logic circuit and/or program instructions. When the chip is run, the chip is configured to implement all or some of the steps of the detection packet transmission method provided in the foregoing method embodiments.

All or some of the foregoing embodiments may be implemented by using software, hardware, firmware, or any combination thereof. When the software is used for implementing embodiments, all or some of embodiments may be implemented in a form of a computer program product. The computer program product includes one or more computer instructions. When the computer program instructions are loaded and executed on a computer, the procedures or functions according to embodiments are all or partially generated. The computer may be a general-purpose computer, a computer network, or another programmable apparatus. The computer instructions may be stored in a computer-readable storage medium, or transmitted from one computer-readable storage medium to another computer-readable storage medium. For example, the computer instructions may be transmitted from one web site, computer, server, or data center to another website, computer, server, or data center in a wired (for example, a coaxial cable, an optical fiber, a digital subscriber line, or the like) or wireless (for example, infrared, radio, microwave, or the like) manner. The computer-readable storage medium may be any usable medium accessible by the computer, or a data storage apparatus, such as a server or a data center, integrating one or more usable media. The usable medium may be a magnetic medium (for example, a floppy disk, a hard disk, a magnetic tape, or the like), an optical medium, a semiconductor medium (for example, a solid-state drive), or the like.

It should be understood that "at least one" mentioned in this specification means one or more, and "a plurality of" means two or more. "At least two" means two or more. Unless otherwise specified, "/" means or. For example, A/B may represent A or B. In this specification, "and/or" describes an association relationship between associated objects and represents that three relationships may exist. For example, A and/or B may represent the following three cases: Only A exists, both A and B exist, and only B exists. In addition, for ease of clear description, terms such as "first", "second", and "third" are used for distinguishing same items or similar items having basically same functions. A person skilled in the art may understand that the terms such as "first", "second", and "third" do not limit a quantity and an execution sequence.

For different types of embodiments such as the method embodiment and the apparatus embodiment provided in embodiments, refer to each other. This is not limited in embodiments. A sequence of the operations of the method embodiment provided in embodiments can be properly adjusted, and the operations can be correspondingly added or deleted based on a situation. Any modified method that can be easily figured out by a person skilled in the art without departing from a technical scope disclosed in this disclosure shall fall within the protection scope of this disclosure, and therefore details are not described again.

In the corresponding embodiments, it should be understood that the disclosed apparatus and the like may be implemented in other composition manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or another form.

The units described as separate parts may or may not be physically separate, and parts described as units may or may not be physical units, that is, may be located at one position, or may be distributed on a plurality of network devices (for example, terminal devices). Some or all of the units may be selected based on actual requirements to achieve the objectives of the solutions of embodiments.

The foregoing descriptions are merely example implementations, but are not intended to limit the protection scope of this disclosure. Any equivalent modification or replacement readily figured out by a person skilled in the art within the technical scope disclosed shall fall within the protection scope of this disclosure. Therefore, the protection scope of this disclosure shall be subject to the protection scope of the claims.

What is claimed is:

1. A method implemented by a first network device that is a first edge network device in a first network domain, the method comprising:

receiving a first packet of a service flow, wherein the first packet comprises a detection header instructing detection of, based on the detection header, a transmission performance of the service flow, wherein the transmission performance is service-level agreement (SLA) performance, a number of lost packets in the service flow, or a transmission delay of a packet in the service flow;

obtaining, based on the first packet, a second packet comprising processing identification information and the detection header, wherein the processing identification information instructs processing of the detection header; and sending the second packet to a second network device that is outside the first network domain and that is a next-hop device of the first network device on a transmission path of the service flow.

2. The method of claim 1, wherein the second packet further comprises a media access control (MAC) header and an Internet Protocol (IP) header, and wherein the processing identification information and the detection header are located between the MAC header and the IP header.

3. The method of claim 2, wherein the processing identification information is located closer to the MAC header than the detection header is, and wherein the processing identification information and the detection header are adjacent to each other.

4. The method of claim 3, wherein the processing identification information comprises an indication identifier and a detection identifier, wherein the indication identifier instructs processing of the detection identifier, and wherein the detection identifier instructs processing of the detection header.

5. The method of claim 4, wherein the indication identifier is located closer to the MAC header than the detection identifier is, and wherein the indication identifier and the detection identifier are adjacent to each other.

6. The method of claim 1, wherein the detection header is an In-situ Flow Information Telemetry (IFIT) header.

7. The method of claim 1, wherein the second network device is a second edge network device in a second network domain.

8. The method of claim 7, wherein the first network device is a tail node device of a first tunnel that belongs to the first network domain, wherein the second network device is a head node device of a second tunnel that belongs to the second network domain, and wherein the first tunnel and the second tunnel are segments of a third tunnel on the transmission path.

9. The method of claim 7, wherein the first network domain or the second network domain is a virtual private network (VPN).

10. The method of claim 1, further comprising:

enabling a capability of carrying the processing identification information and the detection header in a single packet for transmission through a first interface of the first network device; and further sending the second packet to the second network device through the first interface.

11. A first network device that is a first edge network device in a first network domain, the first network device comprising:

a non-transitory memory configured to store instructions; and one or more processors coupled to the non-transitory memory and configured to execute the instructions to cause the first network device to:

receive a first packet of a service flow, wherein the first packet comprises a detection header instructing detection of, based on the detection header, a transmission performance of the service flow, wherein the transmission performance is service-level agreement (SLA) performance, a number of lost packets in the service flow, or a transmission delay of a packet in the service flow;

obtain, based on the first packet, a second packet comprising processing identification information and the detection header, wherein the processing identification information instructs processing of the detection header; and send the second packet to a second network device that is outside the first network domain and that is a next-hop device of the first network device on a transmission path of the service flow.

12. The first network device of claim 11, wherein the second packet further comprises a media access control (MAC) header and an Internet Protocol (IP) header, and wherein the processing identification information and the detection header are located between the MAC header and the IP header.

13. The first network device of claim 12, wherein the processing identification information is located closer to the MAC header than the detection header is, and wherein the processing identification information and the detection header are adjacent to each other.

14. The first network device of claim 13, wherein the processing identification information comprises an indication identifier and a detection identifier, wherein the indication identifier instructs processing of the detection identifier, and wherein the detection identifier instructs processing of the detection header.

15. The first network device of claim 14, wherein the indication identifier is located closer to the MAC header than the detection identifier is, and wherein the indication identifier and the detection identifier are adjacent to each other.

16. A second network device outside a first network domain and comprising:

a non-transitory memory configured to store instructions; and one or more processors coupled to the non-transitory memory and configured to execute the instructions to cause the second network device to:

receive a second packet from a first network device that is an edge network device in the first network domain such that the second network device is a next-hop device of the first network device on a transmission path of a service flow, wherein the second packet is based on a first packet of the service flow, wherein the second packet comprises processing identification information and a detection header, wherein the processing identification information instructs the second network device to process the detection header, and wherein the detection header instructs detection of a transmission performance of the service flow, wherein the transmission performance is service-level agreement (SLA) performance, a number of lost packets in the service flow, or a transmission delay of a packet in the service flow; and detect the transmission performance of the service flow based on the processing identification information and the detection header.

17. The second network device of claim 16, wherein the second packet further comprises a media access control (MAC) header and an Internet Protocol (IP) header, and wherein the processing identification information and the detection header are located between the MAC header and the IP header.

18. The second network device of claim 17, wherein the processing identification information is located closer to the MAC header than the detection header is, and wherein the processing identification information and the detection header are adjacent to each other.

19. The second network device of claim 18, wherein the processing identification information comprises an indication identifier and a detection identifier, wherein the indication identifier instructs processing of the detection identifier, and wherein the detection identifier instructs processing of the detection header.

20. The second network device of claim 19, wherein the indication identifier is located closer to the MAC header than the detection identifier is, and wherein the indication identifier and the detection identifier are adjacent to each other.

21. The method of claim 1, wherein obtaining the second packet comprises removing tunnel information of a tunnel that belongs to the first network domain.

* * * * *